US012117461B2

(12) United States Patent
He

(10) Patent No.: US 12,117,461 B2
(45) Date of Patent: Oct. 15, 2024

(54) BIOLOGICAL DETECTION SYSTEM AND BIOLOGICAL DETECTION DEVICE

(71) Applicant: SKYLA Corporation, Hsinchu (TW)

(72) Inventor: Sz-Shian He, Hsinchu (TW)

(73) Assignee: SKYLA Corporation, Hsinchu (TW)

(*) Notice: Subject to any disclaimer, the term of this patent is extended or adjusted under 35 U.S.C. 154(b) by 721 days.

(21) Appl. No.: 17/308,997

(22) Filed: May 5, 2021

(65) Prior Publication Data

US 2022/0026454 A1 Jan. 27, 2022

Related U.S. Application Data

(60) Provisional application No. 63/054,806, filed on Jul. 22, 2020.

(30) Foreign Application Priority Data

Jan. 7, 2021 (TW) .................................. 110100572

(51) Int. Cl.
G01N 35/10 (2006.01)
G01N 1/40 (2006.01)
(52) U.S. Cl.
CPC ............... G01N 35/10 (2013.01); G01N 1/40 (2013.01)
(58) Field of Classification Search
CPC .................................. G01N 35/10; G01N 1/40
See application file for complete search history.

(56) References Cited

U.S. PATENT DOCUMENTS 4,814,282 A * 3/1989 Holen .................. B01D 21/262
356/427
2003/0031601 A1 2/2003 Gebrian et al.
(Continued)

FOREIGN PATENT DOCUMENTS

CN 101158697 4/2008
CN 104657400 5/2015
(Continued)

OTHER PUBLICATIONS

"Search Report of Europe Counterpart Application", issued on Dec. 16, 2021, p. 1-p .7.
(Continued)

Primary Examiner — Jamel E Williams
(74) Attorney, Agent, or Firm — JCIPRNET

(57) ABSTRACT

A biological detection system includes a control module, a bearing rotatable plate, a first driving module, rotatable sub-plates, second driving modules, and test cassettes. The bearing rotatable plate has a main rotating shaft. The first driving module is electrically connected to the control module and connected to the main rotating shaft, so that the bearing rotatable plate rotates about the main rotating shaft. The rotatable sub-plates each has a respective independent rotating shaft. The rotatable sub-plates are rotatably disposed on the bearing rotatable plate about the respective independent rotating shaft. The independent rotating shafts and the main rotating shaft may have different rotating directions and rotating speeds. The second driving modules are electrically connected to the control module, so that the rotatable sub-plates independently rotate about the respective independent rotating shaft. The test cassettes are detachably disposed on the rotatable sub-plates, and each of the test cassettes includes a micro-channel structure.

24 Claims, 35 Drawing Sheets

(56) References Cited

U.S. PATENT DOCUMENTS

| | | | |
|---|---|---|---|
| 2005/0069913 A1 | | 3/2005 | Mian et al. |
| 2008/0081755 A1 | * | 4/2008 | Kinpara .................... B04B 5/02 |
| | | | 494/37 |
| 2018/0067379 A1 | | 3/2018 | Rho et al. |

FOREIGN PATENT DOCUMENTS

| | | | | |
|---|---|---|---|---|
| CN | 107305210 | | 10/2017 | |
| EP | 1129783 | | 9/2001 | |
| EP | 3020682 | | 5/2016 | |
| EP | 3315198 | | 5/2018 | |
| EP | 3315198 A1 | * | 5/2018 | ........ B01L 3/502707 |
| EP | 3646949 | | 5/2020 | |
| EP | 3646949 A1 | * | 5/2020 | .......... B01L 3/50273 |
| EP | 3646949 B1 | * | 12/2021 | .......... B01L 3/50273 |
| JP | 2012021854 | | 2/2012 | |
| JP | 2012021854 A | * | 2/2012 | |
| JP | 2018174907 | | 11/2018 | |
| TW | I278623 | | 4/2007 | |
| TW | 201107038 | | 3/2011 | |
| TW | 201344193 | | 11/2013 | |
| TW | I580963 | | 5/2017 | |
| TW | I693404 | | 5/2020 | |
| WO | 2004011147 | | 2/2004 | |
| WO | 2011081530 | | 7/2011 | |
| WO | WO-2011081530 A1 | * | 7/2011 | ........ B01L 3/502738 |
| WO | 2014050946 | | 4/2014 | |
| WO | WO-2014050946 A1 | * | 4/2014 | ........ B01L 3/502753 |
| WO | 2015080192 | | 6/2015 | |

OTHER PUBLICATIONS

"Partial Search Report of Europe Counterpart Application", issued on Nov. 30, 2022, p. 1-p. 16.

"Office Action of Taiwan Related Application, Application No. 111133137", issued on Jul. 18, 2023, p. 1-p. 10.

"Office Action of Taiwan Counterpart Application", issued on Oct. 25, 2021, p. 1-p. 4.

"Search Report of Europe Counterpart Application", issued on Mar. 17, 2023, p. 1-p. 19.

"Search Report of Europe Related Application, Application No. 22205455.3", issued on Mar. 13, 2023, p. 1-p .8.

"Office Action of China Counterpart Application", issued on Mar. 18, 2024, p. 1-p .13.

"Notice of allowance of China Counterpart Application", issued on Jun. 21, 2024, p .1-p .4.

* cited by examiner

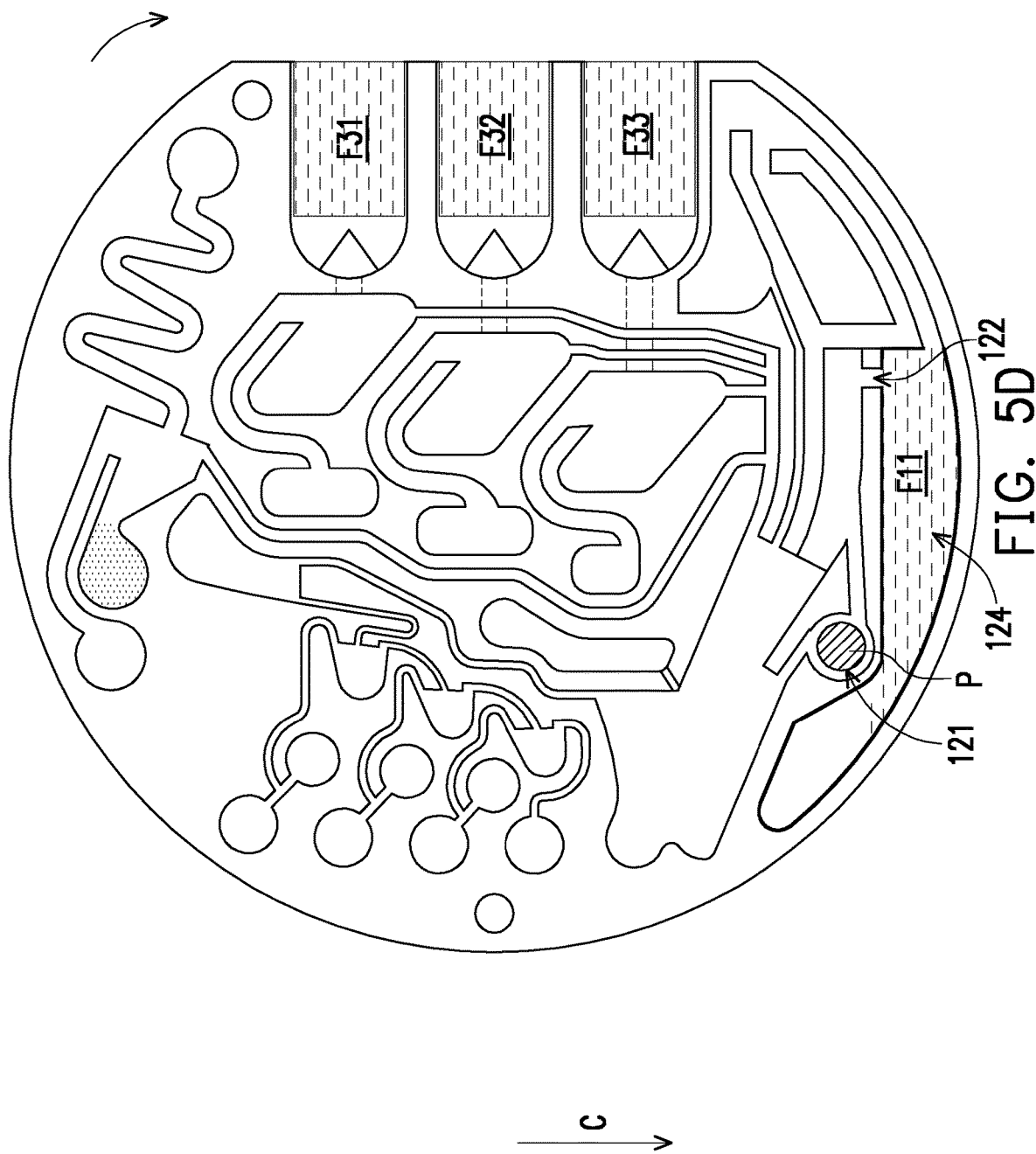

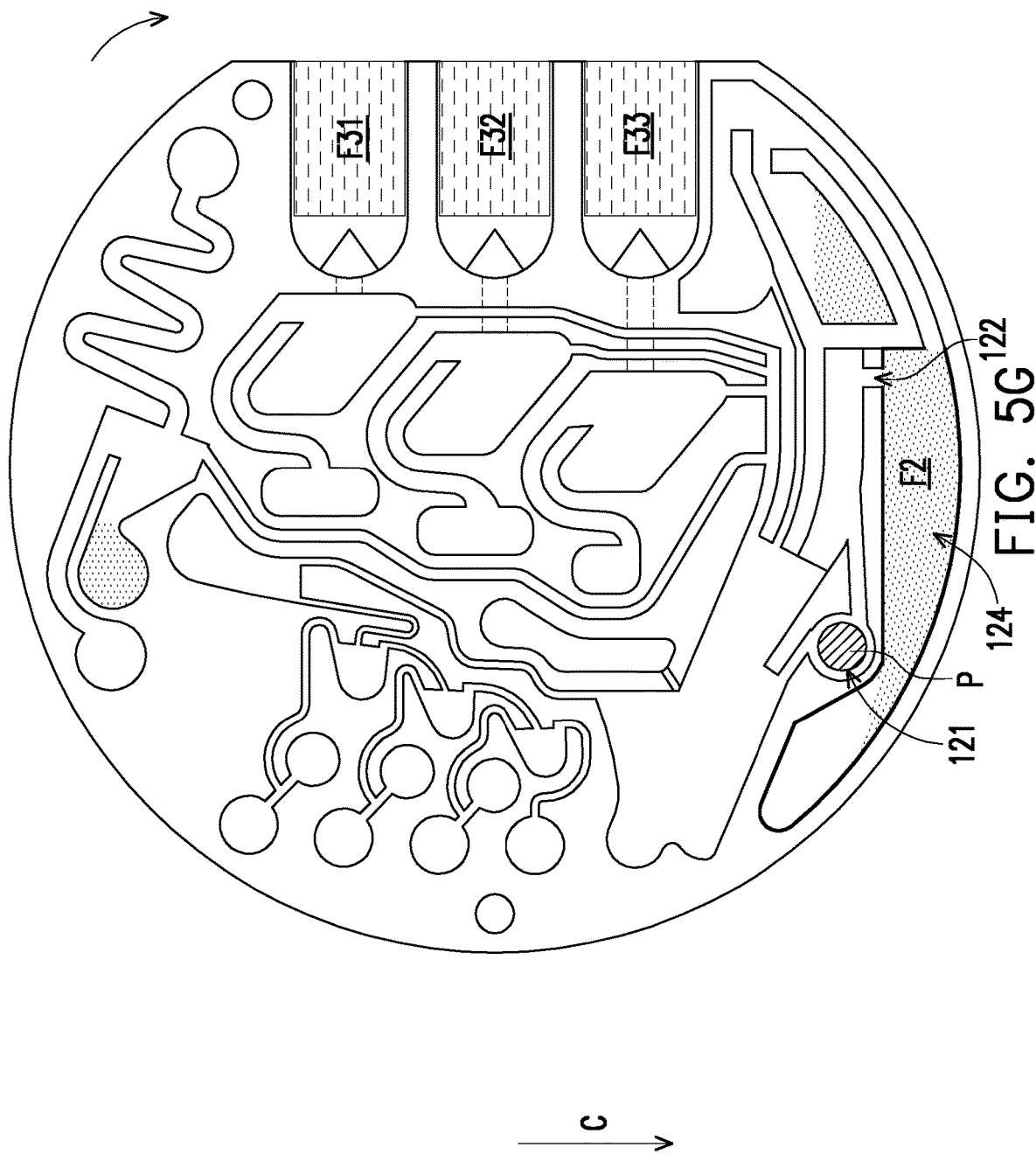

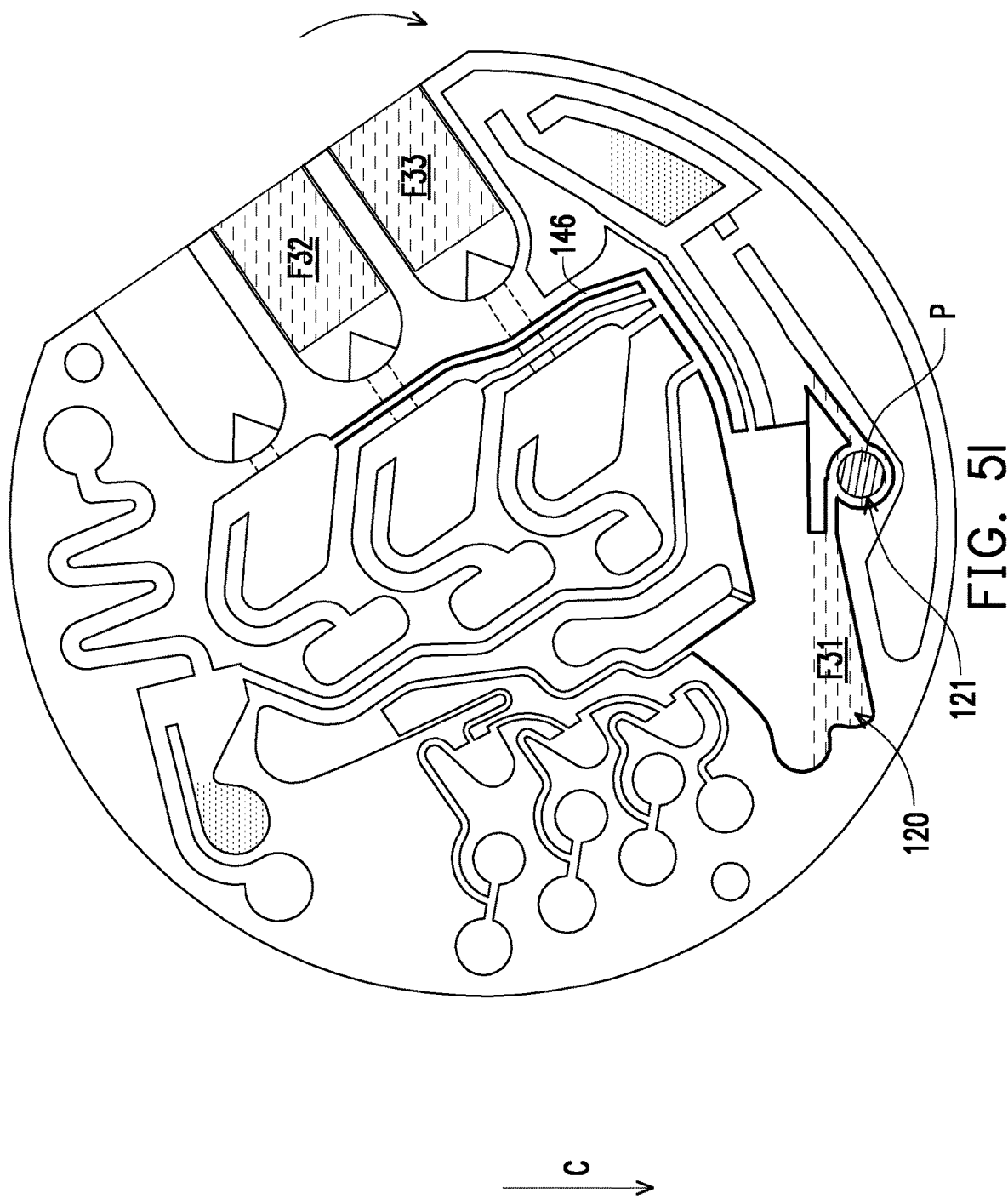

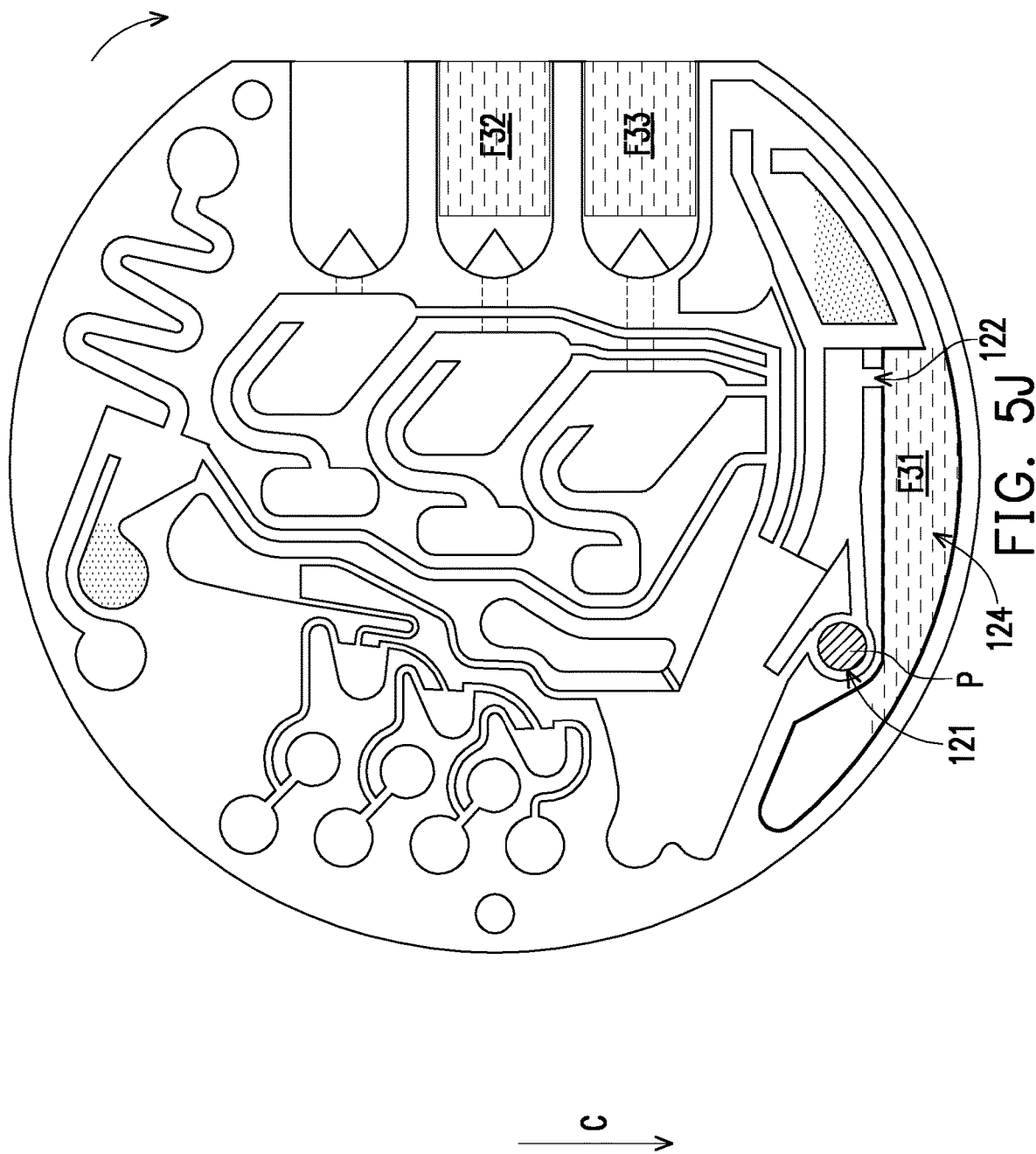

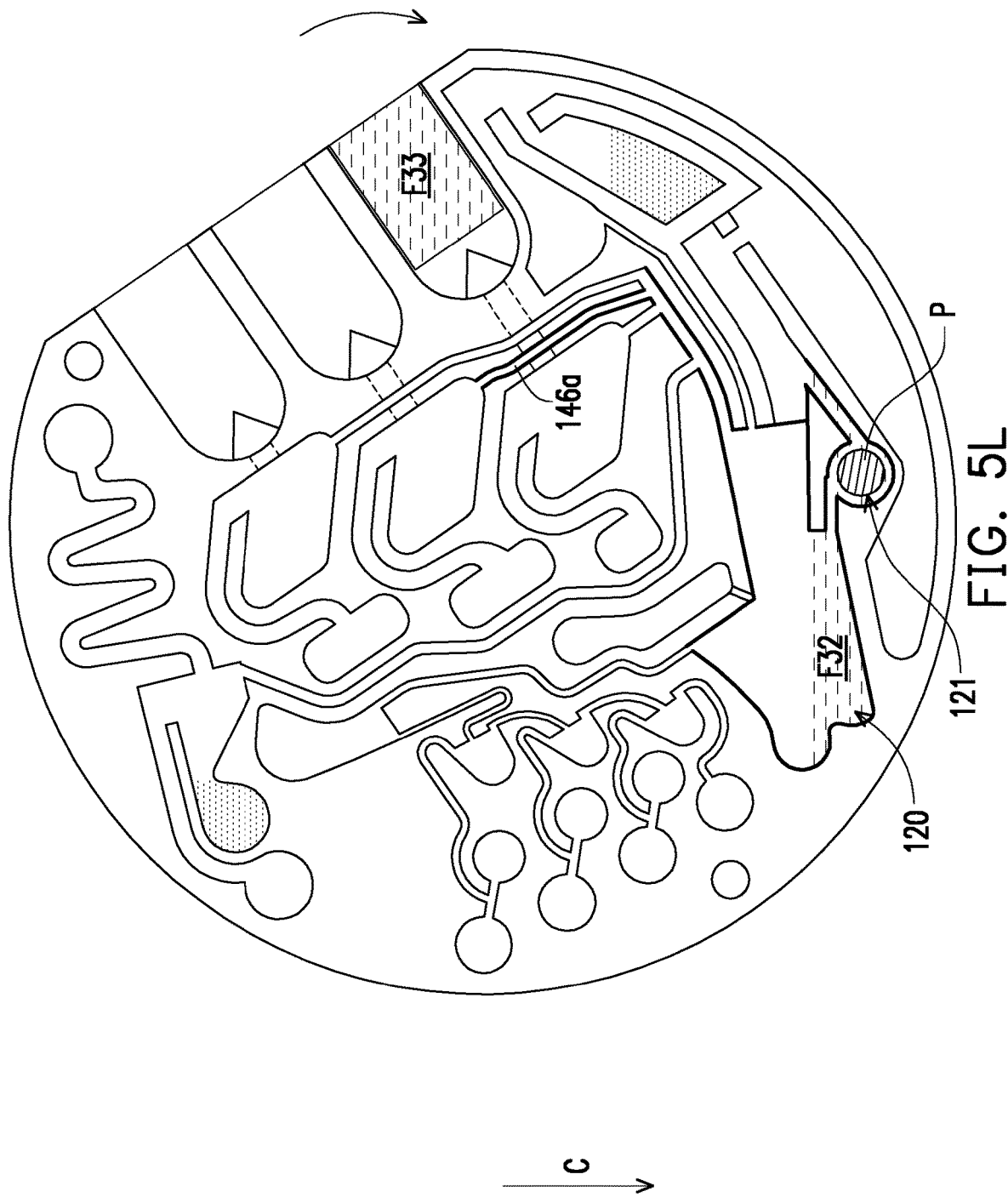

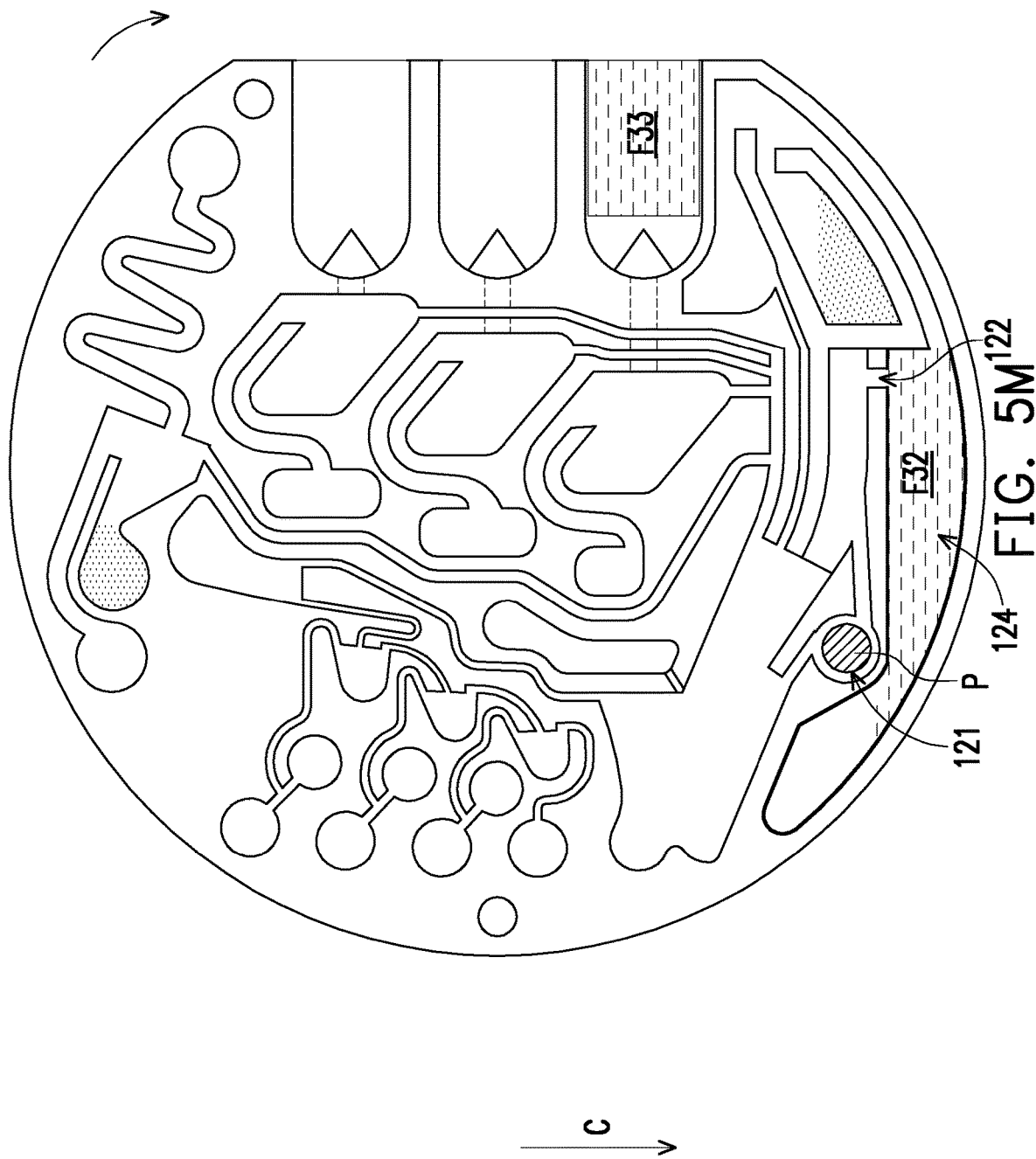

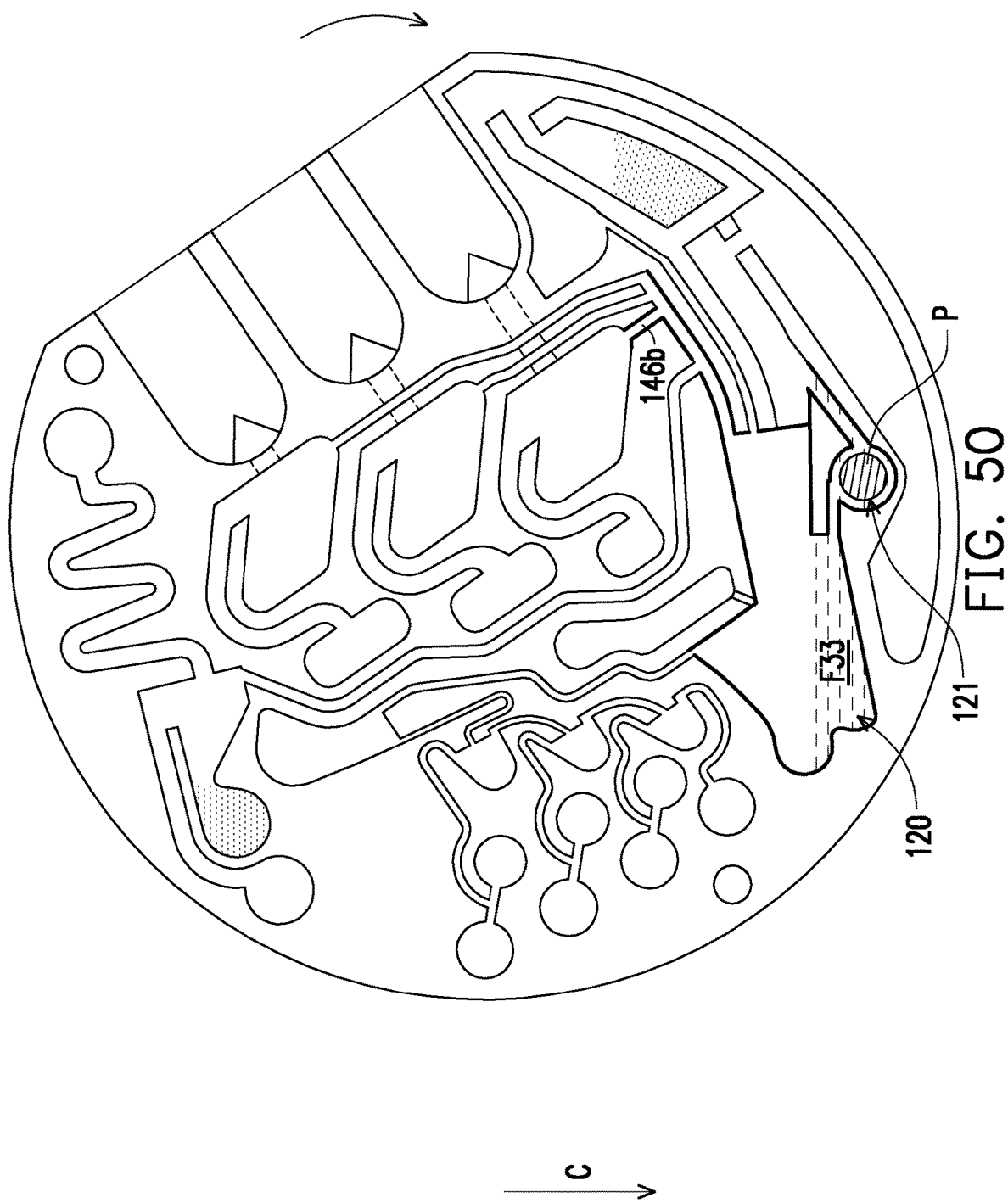

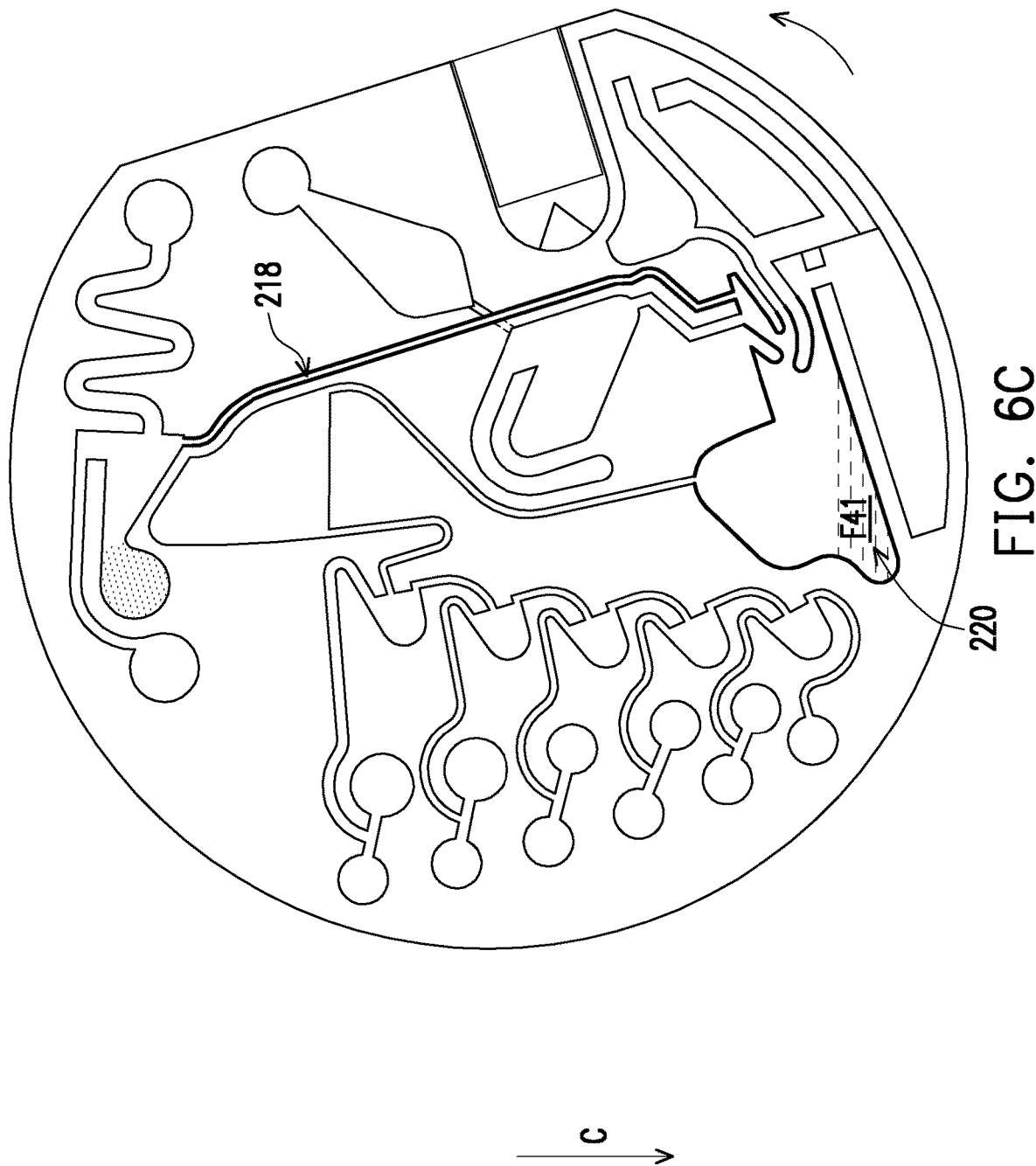

BIOLOGICAL DETECTION SYSTEM AND BIOLOGICAL DETECTION DEVICE

CROSS-REFERENCE TO RELATED APPLICATION

This application claims the priority benefit of U.S. provisional application Ser. No. 63/054,806, filed on Jul. 22, 2020 and Taiwan application serial no. 110100572, filed on Jan. 7, 2021. The entirety of each of the above-mentioned patent applications is hereby incorporated by reference herein and made a part of this specification.

BACKGROUND

Technical Field

The disclosure relates to a detection system and a detection device, and particularly relates to a biological detection system and a biological detection device.

Description of Related Art

In biomedical technologies, controlling the flow of a reagent and a liquid under test (e.g., blood or urine) has been an issue. Conventionally, in biomedical detection, the movement of liquid is controlled by a pipet and the capillarity phenomenon. Thus, if there are multiple test cassettes to be tested, the test cassettes need to be tested one after another, which is time-consuming. While multiple test devices may be used to test the test cassettes to reduce test time, it is costly to purchase multiple test devices.

SUMMARY

The embodiments of the disclosure provide a biological detection system capable of testing a plurality of test cassettes at the same time and effectively controlling the movement of liquid.

The embodiments of the disclosure provide a biological detection device capable of effectively controlling the movement of liquid.

A biological detection system according to an embodiment of the disclosure includes a control module, a bearing rotatable plate, a first driving module, rotatable sub-plates, second driving modules, and test cassettes. The bearing rotatable plate has a main rotating shaft. The first driving module is electrically connected to the control module and connected to the main rotating shaft, and the bearing rotatable plate rotates about the main rotating shaft. The rotatable sub-plates each have independent rotating shaft different from the main rotating shaft. The rotatable sub-plates are disposed on the bearing rotatable plate and each is independently rotatable about the respective independent rotating shaft. The second driving modules are electrically connected to the control module, so that each of the rotatable sub-plates independently rotates about the respective independent rotating shaft. For example, the second driving modules may be connected to the independent rotating shaft, and the independent rotating shafts and the main rotating shaft have different rotating directions and rotating speeds. The test cassettes are detachably disposed on the rotatable sub-plates. Each of the test cassettes includes a micro-channel structure adapted to be disposed with a fluid set. The bearing rotatable plate is driven by the first driving module to rotate about the main rotating shaft, so as to provide a centrifugal force to the test cassettes on the bearing rotatable plate. Each of the rotatable sub-plates is independently driven by one of the second driving modules, so that each of the test cassettes is rotated independently about the respective independent rotating shaft.

According to an embodiment of the disclosure, the biological detection system further includes a third driving module and a pushing rod. The third driving module is electrically connected to the control module and disposed on the bearing rotatable plate. The pushing rod is disposed among the rotatable sub-plates and connected to the third driving module to be driven by the third driving module to approach one of the rotatable sub-plates. The pushing rod is adapted to be inserted into the test cassette on the rotatable sub-plate to break a capsule in the test cassette and make a capsule fluid in the capsule flow into the micro-channel structure.

According to an embodiment of the disclosure, the biological detection system further includes a weight member and a fourth driving module. The weight member is rotatably disposed on the bearing rotatable plate. The fourth driving module is electrically connected to the control module and connected to the weight member, so that the weight member rotates relative to the bearing rotatable plate.

According to an embodiment of the disclosure, the biological detection system further includes a wireless or wired communication module. The wireless or wired communication module is electrically connected to the control module to transmit an external signal to the control module to control the first driving module and at least one of the second driving modules.

According to an embodiment of the disclosure, the second driving modules and the rotatable sub-plates are located on a same side or different sides of the bearing rotatable plate.

According to an embodiment of the disclosure, the test cassettes include a first cassette and a second cassette different from each other, and the micro-channel structures include a first micro-channel structure and a second micro-channel structure different from each other. The first cassette includes the first micro-channel structure, and the second cassette includes the second micro-channel structure. When the first cassette and the second cassette are respectively disposed on two of the rotatable sub-plates, the two rotatable sub-plates are driven by their corresponding second driving modules to rotate in different rotating directions, rotating speeds, or rotating angles.

According to an embodiment of the disclosure, the first micro-channel structure includes a first sample injection port, a first bent segment connected to the first sample injection port, and a first quantification tank connected to the first bent segment. The fluid set corresponds to the first cassette, and includes a first fluid, and the first fluid is injected into the first sample injection port. The second driving module corresponding to the first cassette rotates the rotatable sub-plate, such that the first fluid is driven by the centrifugal force to pass through the first bent segment to flow into the first quantification tank.

According to an embodiment of the disclosure, the first micro-channel structure further includes a second bent segment connected to the first quantification tank and a first mixing tank connected to the second bent segment. The second driving module rotates the rotatable sub-plate, such that the first fluid in the first quantification tank is driven by the centrifugal force to pass through the second bent segment and enter the first mixing tank.

According to an embodiment of the disclosure, the first micro-channel structure further includes a third bent segment connected to the first mixing tank and a waste liquid tank connected to the third bent segment. The second driving module rotates the rotatable sub-plate, such that the first fluid in the first mixing tank is driven by the centrifugal force to pass through the third bent segment and enter the waste liquid tank.

According to an embodiment of the disclosure, the first micro-channel structure includes a second quantification tank, a fourth bent segment connected to the second quantification tank, and a first mixing tank connected to the fourth bent segment. The fluid set corresponds to the first cassette and includes a second fluid. The second driving module rotates the rotatable sub-plate, such that the second fluid is driven by the centrifugal force to sequentially pass through the second quantification tank and the fourth bent segment and enter the first mixing tank.

According to an embodiment of the disclosure, the first micro-channel structure includes a storage tank, a fifth bent segment connected to the storage tank, a third quantification tank connected to the fifth bent segment, a sixth bent segment connected to the third quantification tank, and a first mixing tank connected to the sixth bent segment. The fluid set corresponds to the first cassette and includes a third fluid located in the storage tank, and the second driving module rotates the rotatable sub-plate, such that the third fluid located in the storage tank is driven by the centrifugal force to sequentially pass through the fifth bent segment, the third quantification tank, and the sixth bent segment and enter the first mixing tank.

According to an embodiment of the disclosure, the third fluid is encapsulated by a capsule, the storage tank includes an opening and a needle away from the opening, the capsule is located in the storage tank and beside the needle.

According to an embodiment of the disclosure, the first micro-channel structure includes a first mixing tank, a seventh bent segment connected to the first mixing tank, a fourth quantification tank connected to the seventh bent segment, an eighth bent segment connected to the fourth quantification tank, and a first detection tank connected to the eighth bent segment. The second driving module rotates the rotatable sub-plate, such that the fluid is driven by the centrifugal force to sequentially pass through the seventh bent segment, the fourth quantification tank, and the eighth bent segment and enter the first detection tank.

According to an embodiment of the disclosure, the second micro-channel structure includes a second sample injection port, a ninth bent segment connected to the second sample injection port, a fifth quantification tank connected to the ninth bent segment, a tenth bent segment connected to the fifth quantification tank, and a second mixing tank connected to the tenth bent segment. The fluid set corresponds to the second cassette and includes a fourth fluid, the second driving module corresponding to the second cassette rotates the rotatable sub-plate, such that the fourth fluid is driven by the centrifugal force to sequentially pass through the ninth bent segment, the fifth quantification tank, and the tenth bent segment and enter the second mixing tank.

According to an embodiment of the disclosure, the second micro-channel structure includes a sixth quantification tank, an eleventh bent segment connected to the sixth quantification tank, and a second mixing tank connected to the eleventh bent segment. The fluid sets corresponds to the second cassette and includes a fifth fluid, the second driving module rotates the rotatable sub-plate, such that the fifth fluid is driven by the centrifugal force to sequentially pass through the sixth quantification tank and the eleventh bent segment and enter the second mixing tank.

According to an embodiment of the disclosure, the second micro-channel structure includes a second mixing tank, a twelfth bent segment connected to the second mixing tank, a temporary storage tank connected to the twelfth bent segment, a thirteenth bent segment connected to the temporary storage tank, a seventh quantification tank connected to the thirteenth bent segment, a fourteenth bent segment connected to the seventh quantification tank, and a second detection tank connected to the fourteenth bent segment. The second driving module rotates the rotatable sub-plate, such that a fluid is driven by the centrifugal force to sequentially pass through the twelfth bent segment, the temporary storage tank, the thirteenth bent segment, the seventh quantification tank, and the fourteenth bent segment and enter the second detection tank.

According to an embodiment of the disclosure, when the bearing rotatable plate rotates about the main rotating shaft, a rotating direction or a rotating speed of at least one of the rotatable sub-plates is different from a rotating direction or a rotating speed of the bearing rotatable plate.

An embodiment of the disclosure provides a biological detection device adapted to detect at least one test cassette. Each of the test cassette includes a micro-channel structure and a fluid located in the micro-channel structure. The biological detection device includes a control module, a bearing rotatable plate, a first driving module, at least one rotatable sub-plate, and at least one second driving module. The bearing rotatable plate has a main rotating shaft. The first driving module is electrically connected to the control module and connected to the main rotating shaft, and the bearing rotatable plate rotates about the main rotating shaft. The at least one rotatable sub-plate has at least one independent rotating shaft different from the main rotating shaft. Each of the rotatable sub-plate is disposed on the bearing rotatable plate and independently rotatable about the respective independent rotating shaft. The at least one second driving module is electrically connected to the control module, so that the at least one rotatable sub-plate rotates about the at least one independent rotating shaft.

According to an embodiment of the disclosure, the biological detection device further includes a third driving module and a pushing rod. The third driving module is electrically connected to the control module and disposed on the bearing rotatable plate. The pushing rod is disposed beside the at least one rotatable sub-plate and connected to the third driving module to be driven by the third driving module to approach one of the at least one rotatable sub-plate. The pushing rod is adapted to be inserted into the test cassette on the rotatable sub-plate to break a capsule in the test cassette and make a capsule fluid in the capsule flow into the micro-channel structure.

According to an embodiment of the disclosure, the biological detection device further includes a weight member and a fourth driving module. The weight member is rotatably disposed on the bearing rotatable plate. The fourth driving module is electrically connected to the control module and connected to the weight member, so that the weight member rotates relative to the bearing rotatable plate.

According to an embodiment of the disclosure, the biological detection device further includes a wireless or wired communication module. The wireless or wired communication module is electrically connected to the control module to transmit an external signal to the control module to control the first driving module and at least one of the second driving modules.

According to an embodiment of the disclosure, the at least one second driving module and the at least one rotatable sub-plate are located on a same side or different sides of the bearing rotatable plate.

According to an embodiment of the disclosure, the at least one rotatable sub-plate includes a plurality of rotatable sub-plates disposed on the bearing rotatable plate to surround the main rotating shaft.

According to an embodiment of the disclosure, the at least one rotatable sub-plate includes one rotatable sub-plate, and the rotatable sub-plate and the control module are located at opposite positions in the bearing rotatable plate.

According to an embodiment of the disclosure, when the bearing rotatable plate rotates about the main rotating shaft, a rotating direction or a rotating speed of at least one of the rotatable sub-plates is different from a rotating direction or a rotating speed of the bearing rotatable plate.

Based on the above, the bearing rotatable plate of the biological detection system or the biological detection device according to the embodiments of the disclosure is driven by the first driving module to rotate about the main rotating shaft to provide a centrifugal force to the test cassettes on the bearing rotatable plate. In addition, each of the rotatable sub-plates may be independently driven by a corresponding second driving module. As a result, each of the test cassettes installed to the rotatable sub-plates may rotate independently about the independent rotating shaft, such that the fluid set in the test cassettes may receive or offset the centrifugal force provided by the bearing rotatable plate to be accelerated or decelerated in the micro-channel structures. Therefore, compared with the pipet or the capillarity phenomenon conventionally adapted to control liquid movement, the biological detection system or the biological detection device according to the embodiments of the invention rotates the bearing rotatable plate and the rotatable sub-plates via active control to quickly and efficiently drive the fluid with centrifugal force. Besides, the biological detection system according to the embodiments of the invention is capable of testing multiple test cassettes at the same time to significantly reduce test time.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIGS. 6B to 6H are schematic views illustrating a test process of the test cassette of FIG. 6A.

DESCRIPTION OF THE EMBODIMENTS

Figure 1:
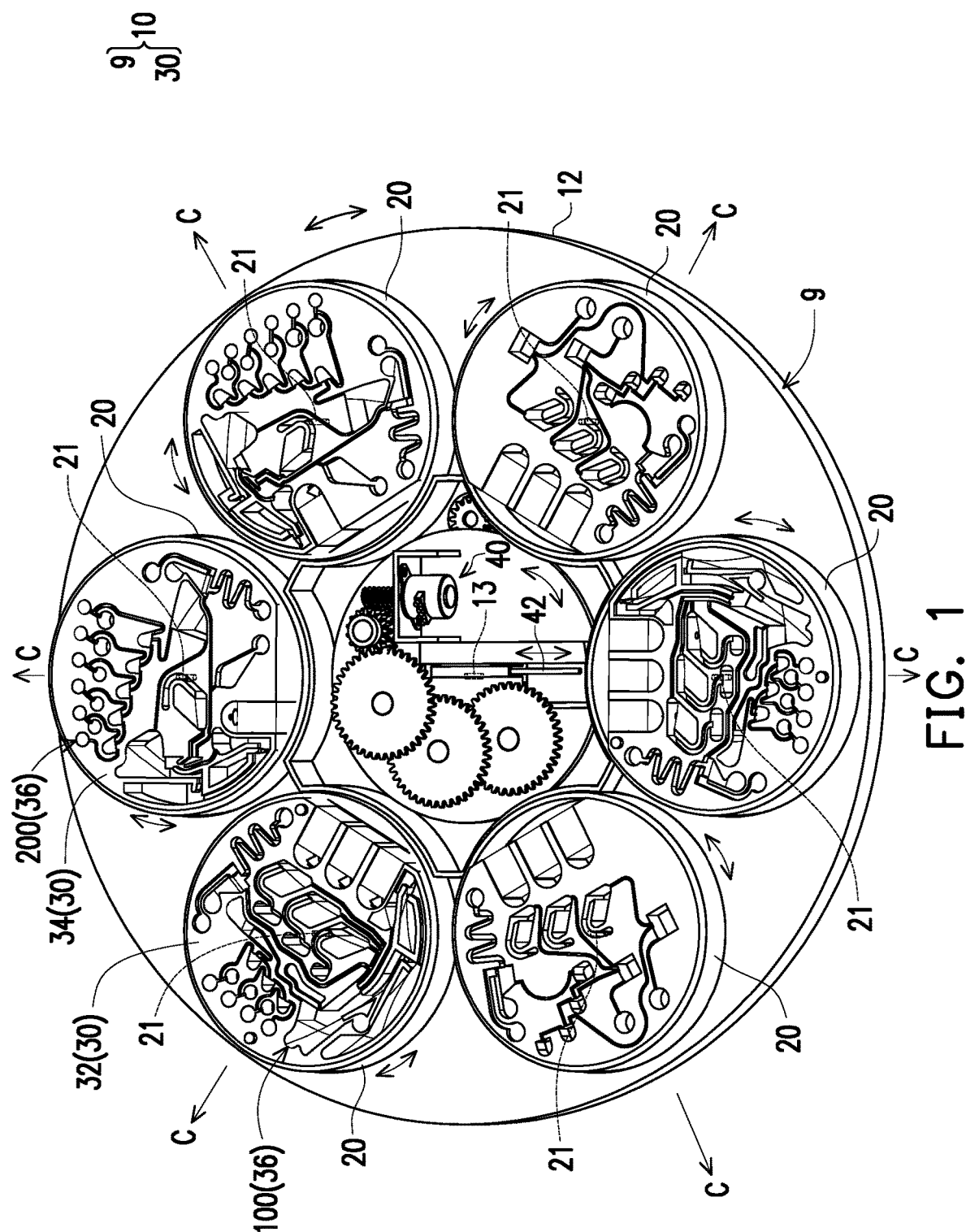
FIG. 1 is a perspective view illustrating the front side of a biological detection system according to an embodiment of the disclosure.

Reference will now be made in detail to the preferred embodiments of the disclosure, examples of which are illustrated in the accompanying drawings. Wherever possible, the same reference numbers are used in the drawings and the description to refer to the same or like parts.

A biological detection system capable of testing a plurality of test cassettes at the same time is provided. With the biological detection system, test time can be reduced significantly.

Figure 2:
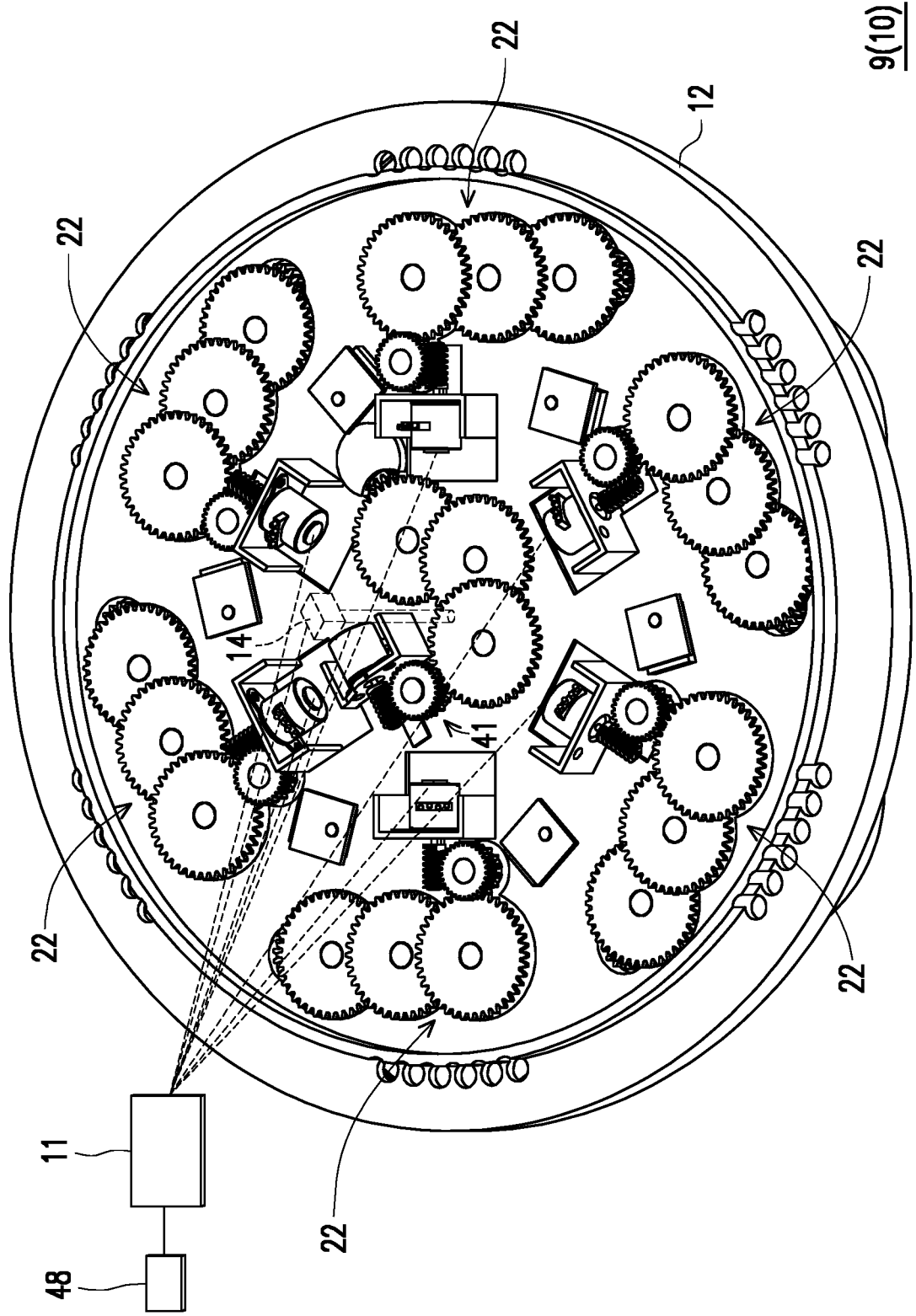
FIG. 2 is a perspective view illustrating the back side of the biological detection system of FIG. 1.

FIG. 1 is perspective view illustrating the front side of a biological detection system according to an embodiment of the disclosure. FIG. 2 is a perspective view illustrating the back side of the biological detection system of FIG. 1. Referring to FIGS. 1 and 2, a biological detection system 10 of the embodiment includes a biological detection device 9 and a plurality of test cassettes 30. The biological detection device 9 includes a control module 11 (as shown in FIG. 2), a bearing rotatable plate 12, a first driving module 14 (as shown in FIG. 2), a plurality of rotatable sub-plates 20, and a plurality of second driving modules 22 (as shown in FIG. 2).

As shown in FIG. 2, the bearing rotatable plate 12 is provided with a main rotating shaft 13 (FIG. 1). The main rotating shaft 13 is the central shaft of the bearing rotatable shaft 12. The first driving module 14 is electrically connected to the control module 11 and connected to the main rotating shaft 13, and receives a command of the control module 11 to drive the bearing rotatable plate 12 to rotate about the main rotating shaft 13. In FIG. 2, the first driving module 14 is merely shown for as an example. The form of the first driving module 14 is not limited thereto. The first driving module 14 may be a motor, a memory metal which deforms as the temperature changes, or an actuator in other forms.

As shown in FIG. 1, in the embodiment, each of the rotatable sub-plates 20 has a respective independent rotating shaft 21. The independent rotating shafts 21 are the central shafts of the rotatable sub-plates 20. Therefore, the independent rotating shafts 21 are not co-axial with the main rotating shaft 13. The rotatable sub-plates 20 are disposed on the bearing rotatable plate 12 and rotatable about the respective independent rotating shafts 21 so as to rotate relative to the bearing rotatable plate 12. The rotating direction or the rotating speed of any of the independent rotating shafts 21 may be different from those of the main rotating shaft 13.

In addition, while an example with six rotatable sub-plates 20 is illustrated in the embodiment, the number of the rotatable sub-plates 20 is not limited thereto. In other embodiments, the number of the rotatable sub-plates 20 may be any number from 2 to 10 or even more than 10. Alternatively, there may also be only one rotatable sub-plate 20.

As shown in FIG. 2, each of the second driving modules 22 is electrically connected to the control module 11 and connected to the respective independent rotating shaft 21, and receives a command from the control module 11 to drive the corresponding rotatable sub-plate 20 to independently rotate about the independent rotating shaft 21. In other embodiments, the second driving modules 22 may alternatively push the edges or other parts of the rotatable sub-plates 20 to rotate the rotatable sub-plates 20 independently, rather than driving the independent rotating shafts 21 to rotate the rotatable sub-plates 20 independently. In addition, the second driving modules 22 may be motors, memory metals which deform as the temperature changes, or actuators in other forms.

In the embodiment, the rotatable sub-plates 20 are located on the front surface of the bearing rotatable plate 12, whereas the second driving modules 22 (as shown in FIG. 2) are located on the back surface of the bearing rotatable plate 12. Accordingly, the second driving modules 22 and the rotatable sub-plates 20 are located on opposite sides of the bearing rotatable plate 12. Nevertheless, the relative positions among the second driving modules 22, the rotatable sub-plates 20, and the bearing rotatable plate 12 are not limited thereto.

In the embodiment, the number of the second driving modules 22 matches the number of the rotatable sub-plates 20. Each of the rotatable sub-plates 20 is independently driven by a designated second driving module 22. Therefore, in the biological detection system 10 of the embodiment, the bearing rotatable plate 12 may rotate about the main rotating shaft 13 while each of the rotatable sub-plates 20 may further independently rotate about the independent rotating shafts 21. Since each of the rotatable sub-plates 20 is independently driven by the designated second driving module 22, the rotating speeds, the rotating directions, the rotating angles of the rotatable sub-plates 20 may differ from one another. Accordingly, the test cassette 30 or the flow of liquid on each of the rotatable sub-plates 20 may receive or offset the centrifugal force generated by the rotation of the bearing rotatable plate 12, based on different needs.

In the embodiment, the test cassettes 30 may be detachably disposed on the rotatable sub-plates 20. Those carrying out the test may install the test cassettes 30 as needed to the rotatable sub-plates 20 and remove the test cassettes 30 from the rotatable sub-plates 20 after the test is completed. Those carrying out the test may also conduct tests on test cassettes 30 in other forms based on needs.

After being installed to the rotatable sub-plates 20, the test cassettes 30 are fixed to and actuated with the rotatable sub-plates 20. Therefore, when the biological detection system 10 is operating, the bearing rotatable plate 12 is driven by the first driving module 14 to rotate about the main rotating shaft 13. At this time, the test cassettes 30 also rotate about the main rotating shaft 13 (i.e., revolution). At this stage, each of the rotatable sub-plates 20 may be independently driven by the corresponding second driving modules 22. Accordingly, the test cassettes 30 may further rotate about the independent rotating shafts 21, so as to rotate to different angles in different rotating speeds and rotating directions.

In an embodiment, in addition to that the bearing rotatable plate 12 disposed as a first layer and the rotatable sub-plates 20 disposed as a second layer are capable of rotating independently, the biological detection system 10 may further include a plurality of rotatable plates (not shown) as a third layer on top of the second layer. The rotatable plates at the third layer may be driven by additional driving modules so that they can rotate independently. That is, the bearing rotatable plate 12 at the first layer, the rotatable sub-plates 20 at the second layer, and the rotatable plates at the third layer are driven by different driving modules to rotate independently from one another. Of course, the number of layers of the rotatable plates in the biological detection system 10 may also be four or more and shall not be limited to the above.

Meanwhile, in the biological detection system 10 of the embodiment, the rotatable sub-plates 20 at the second layer are directly disposed on the bearing rotatable plate 12 at the first layer. In the biological detection systems of other embodiments, there may be other components disposed between the rotatable sub-plates 20 and the bearing rotatable plate 12. In such embodiment, the bearing rotatable plate 12 may be considered as the first layer, other components (which may or may not be rotatable, the disclosure is not particularly limited in this regard) may be considered as the second layer, and the rotatable sub-plates 20 may be considered as the third layer or even other layers. Alternatively, in other embodiments, the locations and the number of layers of the bearing rotatable plate 12 and the rotatable sub-plates 20 are not limited to the above, as long as the rotatable sub-plates 20 are able to rotate independently and receive the centrifugal force generated during the rotation of the bearing rotatable plate 12.

In the embodiment, each of the test cassettes 30 includes a micro-channel structure 36, and a fluid is injected or placed into the micro-channel structure 36. When the bearing rotatable plate 12 rotates (revolves) about the main rotating shaft 13, the fluid in the test cassette 30 may be thrown toward the direction of a centrifugal force C. Since the test cassettes 30 may be rotated to different angles in different rotating speeds and rotating directions, an operator may adjust the angles of the micro-channel structures 36 with respect to the centrifugal force C to accelerate or decelerate the movement of fluids to specific positions in the micro-channel structures 36. Such operation will be described in detail in subsequent paragraphs.

Meanwhile, in the embodiment, the biological detection system 10 may optionally include a wireless communication module 48 (as shown in FIG. 2). The wireless communication module 48 is electrically connected to the control module 11 so that an external signal can be received and transmitted to the control module 11 to control the first driving module 14 and one or more of the second driving modules 22. For example, when some of the rotatable sub-plates 20 are not provided with the test cassettes 30, or when the test is conducted batch-by-batch, the rotatable sub-plates 20 without the test cassettes 30 or the rotatable sub-plates 20 in a batch not under test do not need to rotate.

Of course, in other embodiments, the biological detection system 10 may be connected to an external computer in a wired manner for signal transmission, so as to obtain the control signal of the first driving module 14 and the second driving modules 22. The biological detection system 10 is not particularly limited in this regard.

Besides, in the embodiment, the biological detection system 10 may optionally include a third driving module 40 (as shown in FIG. 1), another third driving module 41 (as shown in FIG. 2), and a pushing rod 42. The third driving modules 40 and 41 may be motors, memory metals which deform as the temperature changes, or actuators in other forms. The third driving modules 40 and 41 are electrically connected to the control module 11 and disposed on the bearing rotatable plate 12. The pushing rod 42 is disposed among the rotatable sub-plates 20 and actuated by the third driving modules 40 and 41, so as to be driven by the third driving modules 40 and 41 to approach one of the rotatable sub-plates 20.

In the embodiment, the third driving module 41 of FIG. 2 is disposed on the back surface of the bearing rotatable plate 12 to control the pushing rod 42 to rotate to the rotatable sub-plate 20 to be approached. Besides, the third driving module 40 shown in FIG. 1 is disposed on the front surface of the bearing rotatable plate 12 to control the pushing rod 42 to move forward or backward. Of course, in other embodiments, the types of the third driving modules 40 and 41 are not limited thereto. The third driving modules 40 and 41 may be replaced by other structures enabling rotation and movement, or may be a single assembly such as a robotic arm.

Figure 5A:
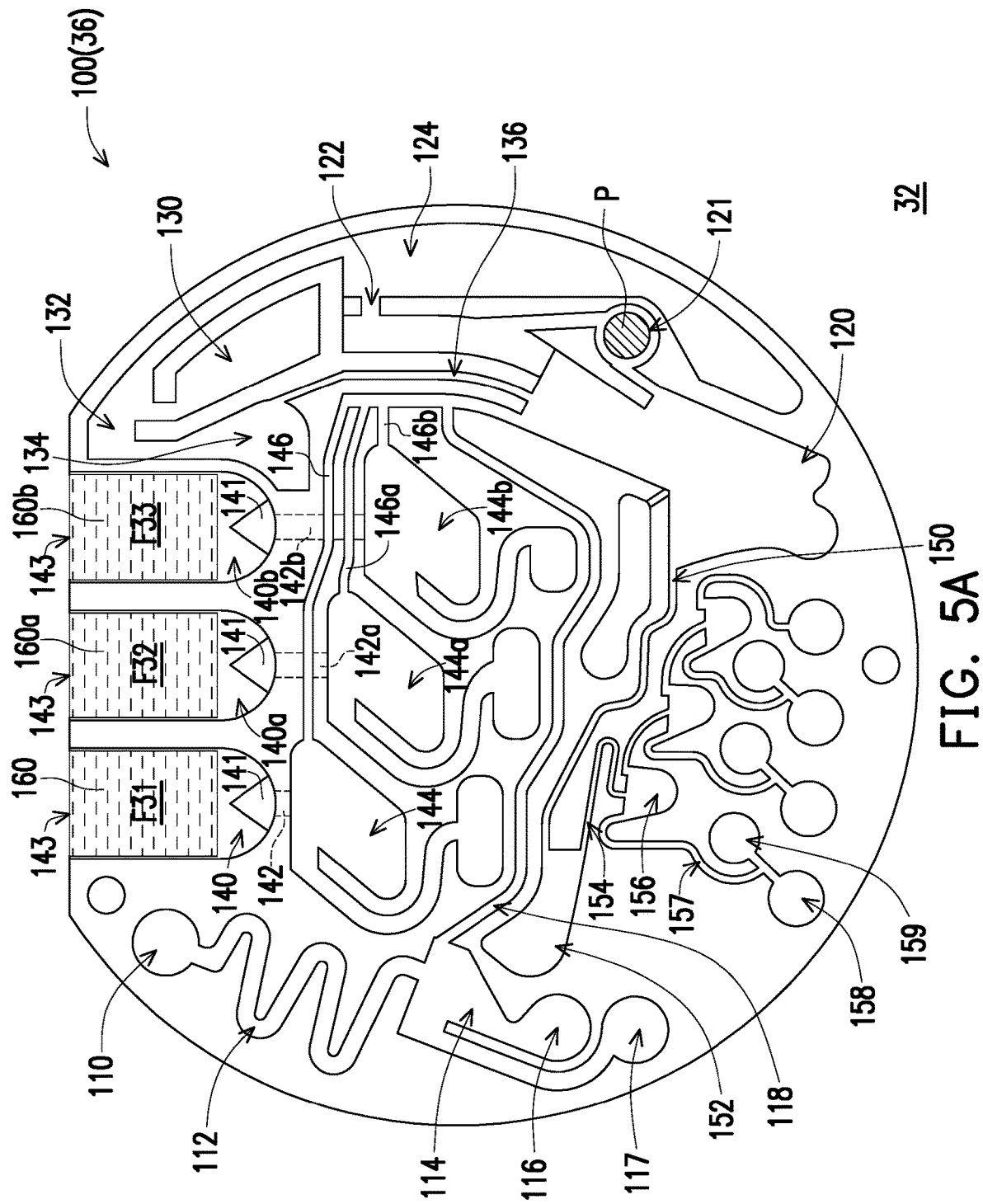
FIG. 5A is a top view of a test cassette of the biological detection system of FIG. 1.

At a specific timing, the pushing rod 42 is adapted to be inserted into the cassette 30 on the rotatable sub-plate 20, so that a capsule 160 (as shown in FIG. 5A) in the test cassette 30 is pushed forward and pierced through. As a result, a capsule fluid in the capsule 160 flows into the micro-channel structure 36. Details in this regard will be described in subsequent paragraphs.

In the following, the operation principle of the biological detection system will be described.

Figure 3A:
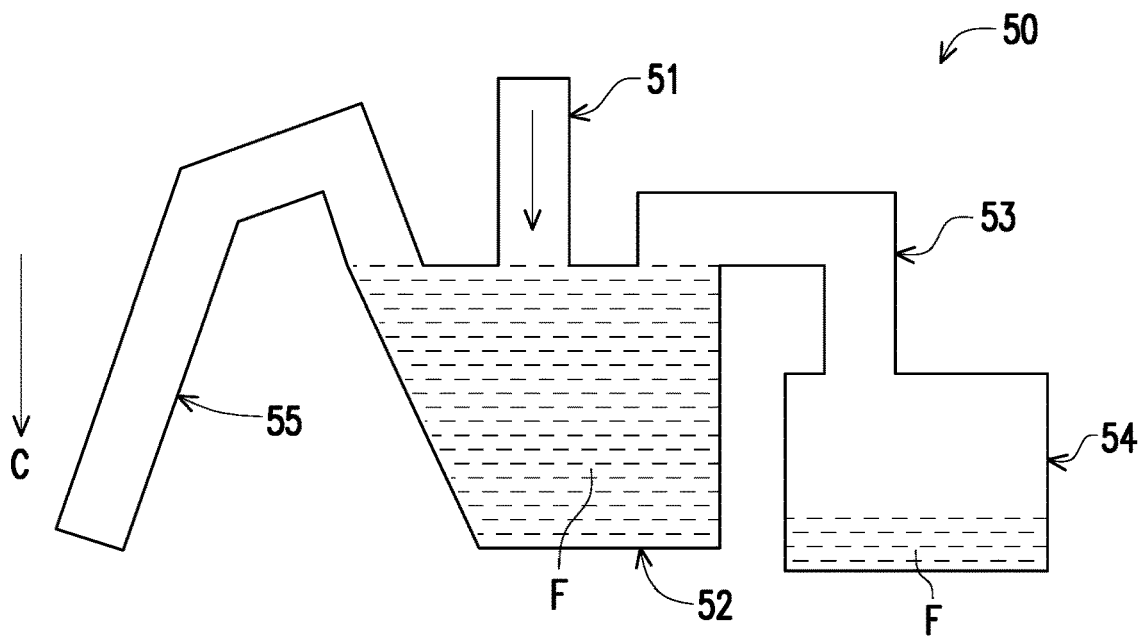
FIGS. 3A to 4C are schematic views illustrating an operation principle of a biological detection system.
Figure 3B:
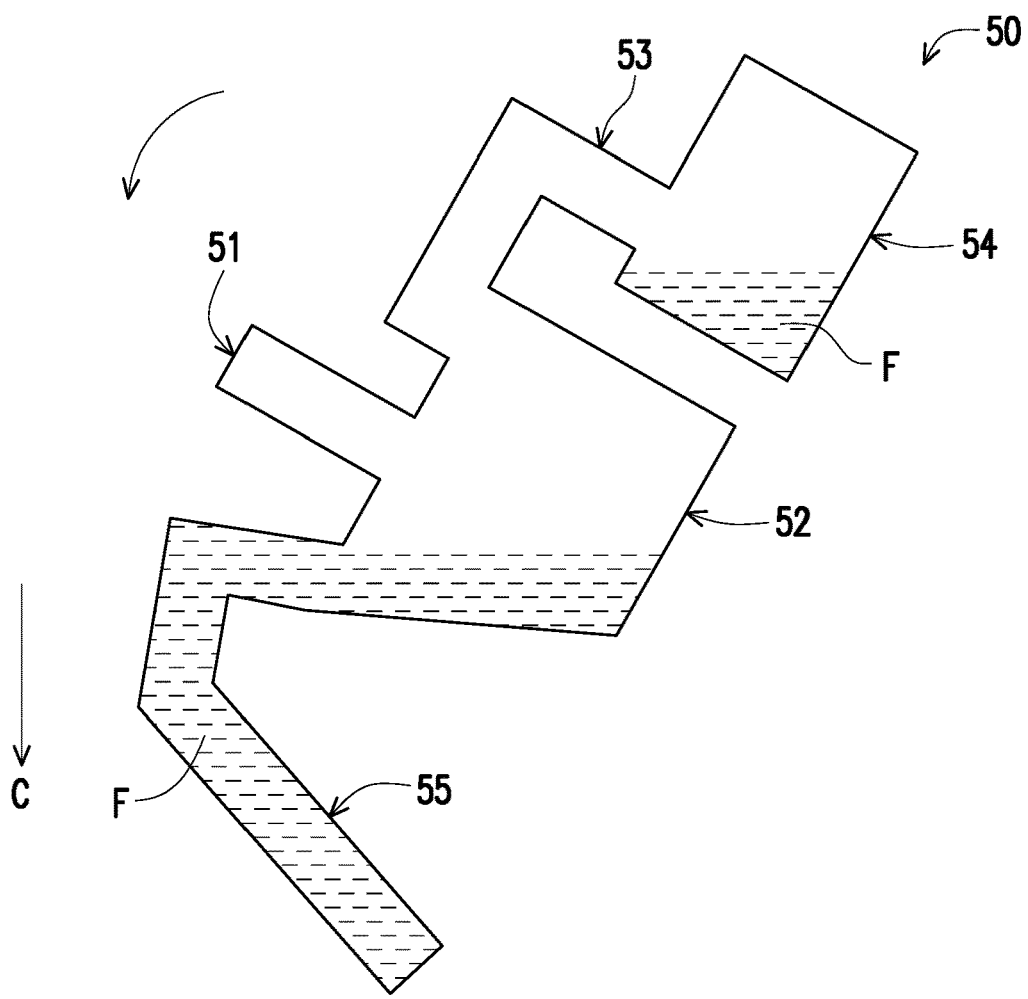

FIGS. 3A to 4C are schematic views illustrating an operation principle of a biological detection system. Referring to FIGS. 3A and 3B, in the embodiment, a fluid channel structure 50 is disposed in the test cassette 30 on the rotatable sub-plate 20 of FIG. 1, for example. When the bearing rotatable plate 12 of the biological detection system 10 rotates, the rotatable sub-plate 20 receives the centrifugal force C. If the rotatable sub-plate 20 on which the fluid channel structure 50 is mounted is rotated relative to the bearing rotatable plate 12 to a specific angle, a fluid F may be moved in a specific direction or to a specific space in the fluid channel structure 50.

Specifically, when the fluid channel structure 50 is at a position relative to the direction of the centrifugal force C as indicated in FIG. 3A, the fluid F may flow to a quantification tank 52 through an injection port 51 of the fluid channel structure 50, and an excessive fluid F may flow to an overflow tank 54 through a pipe 53. Specifically, when the fluid channel structure 50 is rotated relative to the direction of the centrifugal force C to the position indicated in FIG. 3B, the fluid F in the quantification tank 52 may flow out via an outlet pipe 55.

Figure 3C:
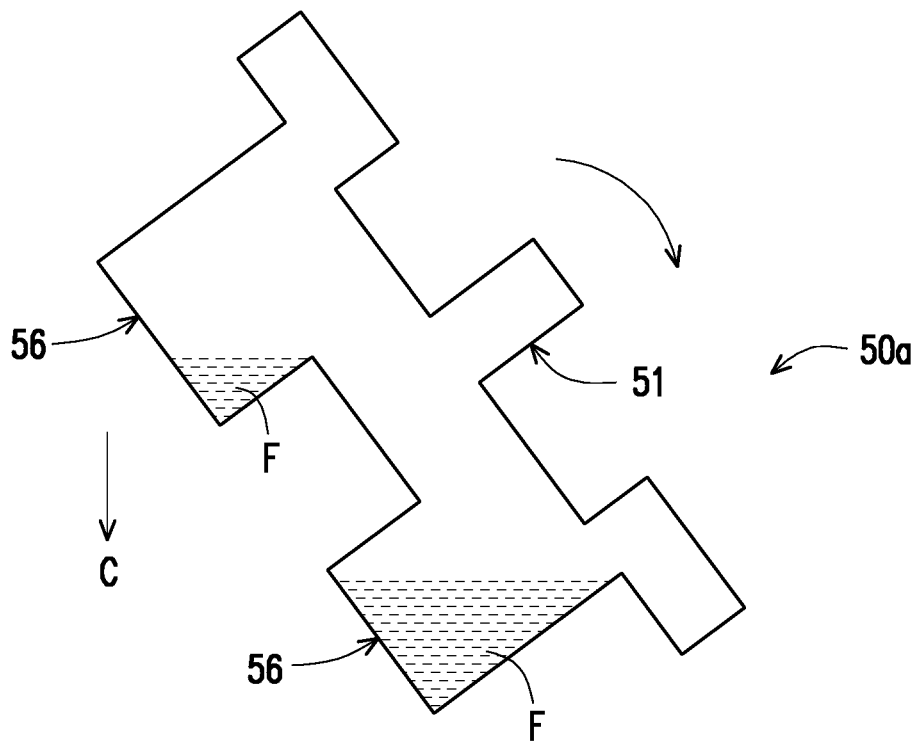
Figure 3D:
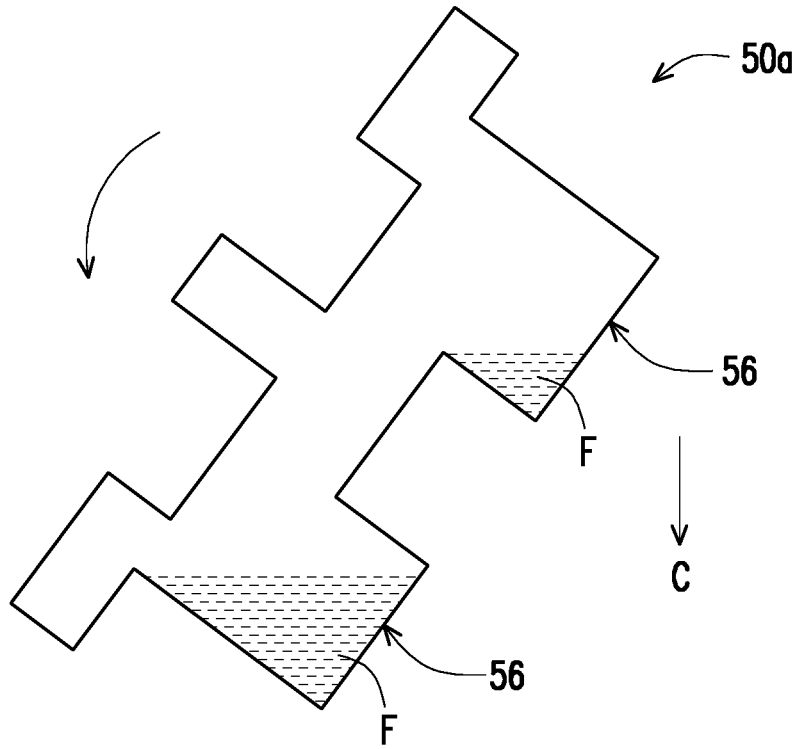

Referring to FIGS. 3C and 3D, in the embodiment, when a flow channel structure 50a is rotated relative to the direction of the centrifugal force C back and forth between the positions indicated in FIGS. 3C and 3D, the fluid F may reciprocally flow from one tank 56 to another tank 56 for mixing.

Figure 4A:
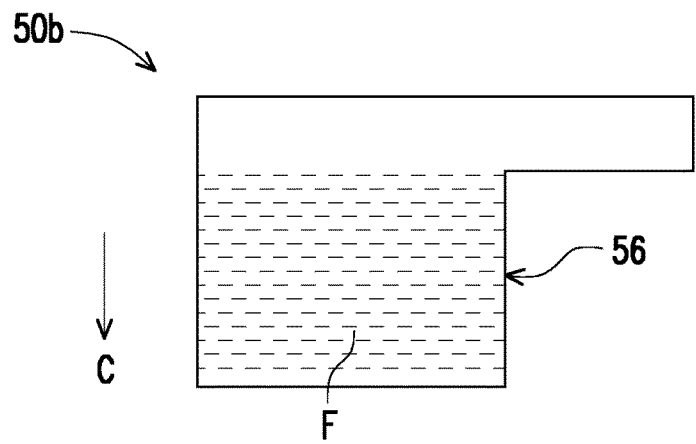
Figure 4B:
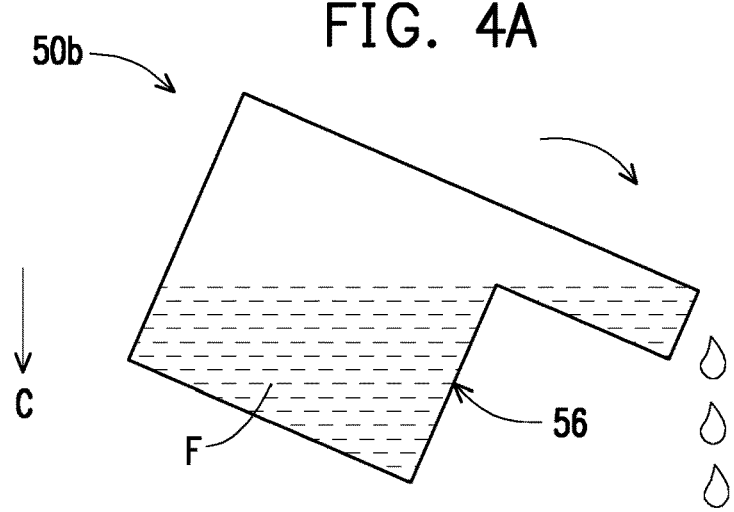
Figure 4C:
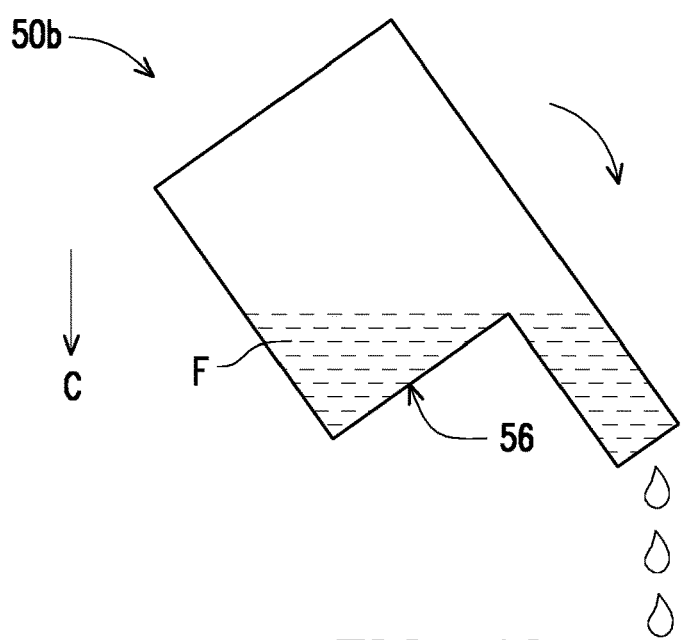

Referring to FIGS. 4A to 4C, in the embodiment, when a flow channel structure 50b is rotated relative to the direction of the centrifugal force C from the position shown in FIG. 4A to the positions shown in FIGS. 4B and 4C, the fluid F in the tank 56 may be poured out in separate trials and amounts.

Thus, by controlling the angle of the flow channel relative to the direction of the centrifugal force C, the fluid F may be controlled to move to a specific position in the flow channel, so as to achieve a specific function (e.g., quantification, mixing, etc.)

Referring to FIG. 1 again, in the embodiment, the test cassettes 30 include a first cassette 32 and a second cassette 34 of different designs, which may be used for different tests or different specimens. The first cassette 32 includes a first micro-channel structure 100, and the second cassette 34 includes a second micro-channel structure 200. The first micro-channel structure 100 and the second micro-channel structure 200 may be micro-channel structures 36 of different designs.

When the first cassette 32 and the second cassette 34 are respectively disposed on two of the rotatable sub-plates 20, depending on the designs of the first micro-channel structure 100 and the second micro-channel structure 200, these two rotatable sub-plates 20 may be driven by two of the second driving modules 22 to rotate with different steps for different functions based on needs.

Figure 5B:
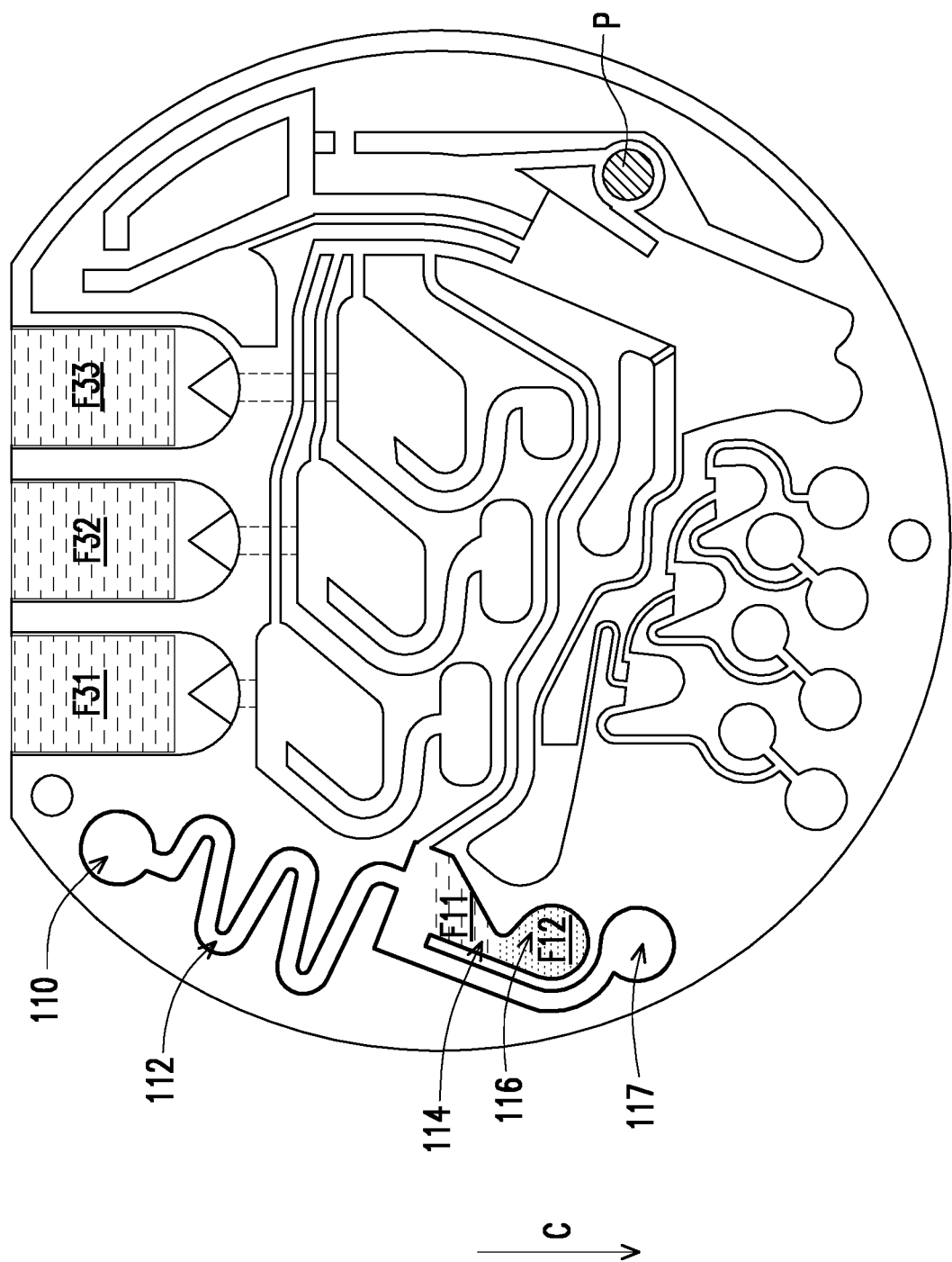
FIGS. 5B to 5R are schematic views illustrating a test process of the test cassette of FIG. 5A.

In the following, the test process of the first cassette 32 will be described. FIG. 5A is a top view of a test cassette of the biological detection system of FIG. 1. FIGS. 5B to 5R are schematic views illustrating a test process of the test cassette of FIG. 5A. Referring to FIGS. 5A and 5B, in the embodiment, the first micro-channel structure 100 includes a first sample injection port 110, a first bent segment 112 connected to the first sample injection port 110, a first quantification tank 114 connected to the first bent segment 112, and a separation tank 116 and an overflow tank 117 connected to the first quantification tank 114.

In the process from FIGS. 5A to 5B, the specimen under test (e.g., blood, but the disclosure is not limited thereto) is injected into the first sample injection port 110. In the embodiment, the blood includes plasma (first fluid F11) and blood cells F12.

Under the acting of the centrifugal force C, the blood passes through the first bent segment 112 and is separated into plasma (the first fluid F11) and the blood cells F12. The blood cells F12 with a greater density may flow to the separation tank 116 at this stage, and the plasma (the first fluid F11) may flow to the first quantification tank 114 for subsequent use. In addition, in the embodiment, excessive blood may flow to the overflow tank 117.

Figure 5C:
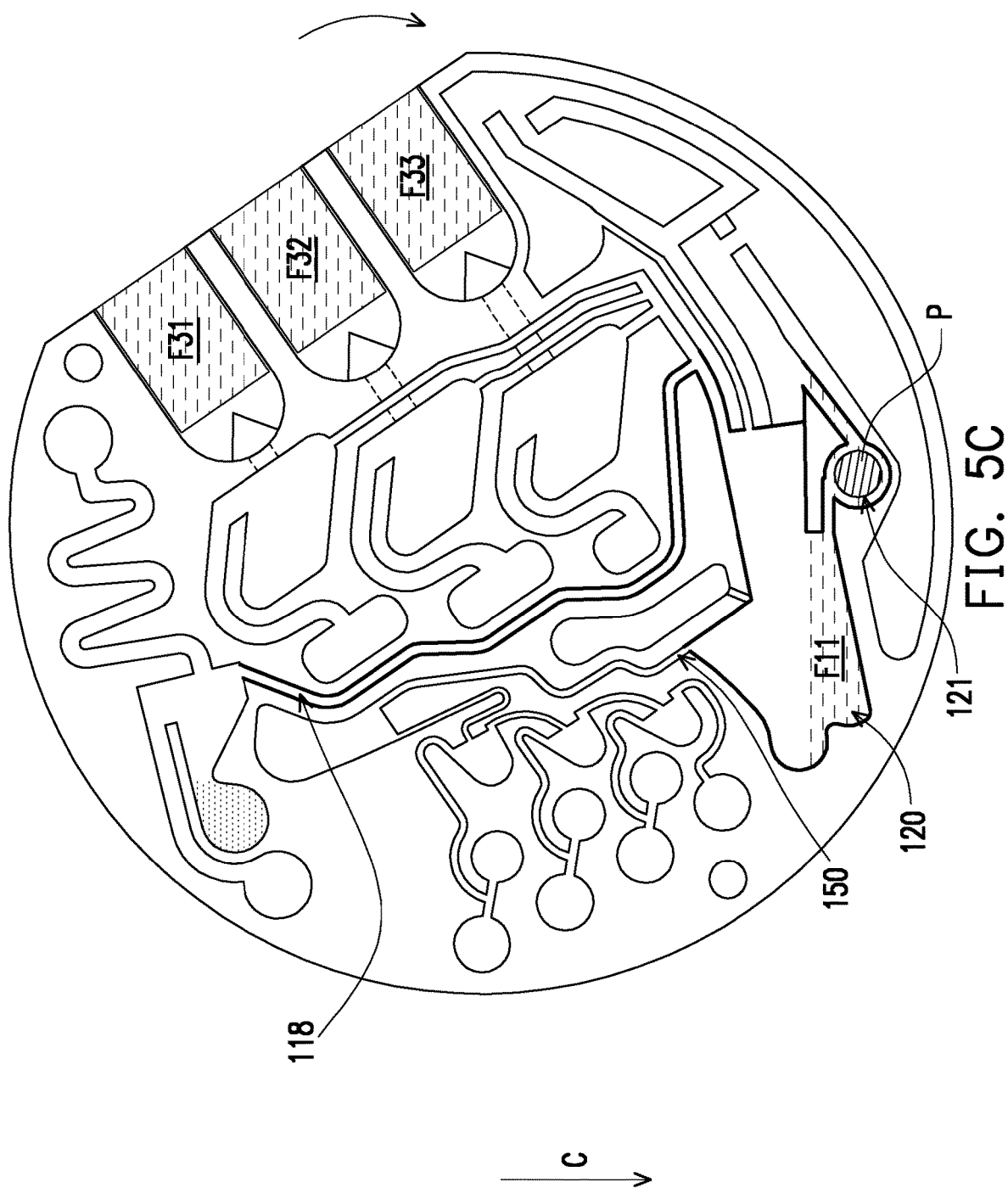

Then, the first micro-channel structure 100 is rotated relative to the direction of the centrifugal force C to the position indicated in FIG. 5C. In the embodiment, the first micro-channel structure 100 further includes a second bent segment 118 connected to the first quantification tank 114 and first mixing tanks 120 and 121 connected to the second bent segment 118. The second driving module 22 rotates the rotatable sub-plate 20 such that the first fluid F11 originally located in the first quantification tank 114 is driven by the centrifugal force C to pass through the second bent segment 118 and enter the first mixing tanks 120 and 121. In the embodiment, an antibody P may be provided in the first mixing tank 121, and the first fluid F11 may be mixed with the antibody P in the first mixing tanks 120 and 121.

Then, the first micro-channel structure 100 is rotated relative to the direction of the centrifugal force C to the position indicated in FIG. 5D. In the embodiment, the first micro-channel structure 100 further includes a third bent segment 122 connected to first mixing tanks 120 and 121 and a waste liquid tank 124 connected to the third bent segment 122. The second driving module 22 rotates the rotatable sub-plate 20 such that the first fluid F11 located in the first mixing tanks 120 and 121 is driven by the centrifugal force C to pass through the third bent segment 122 and enter the waste liquid tank 124.

Figure 5E:
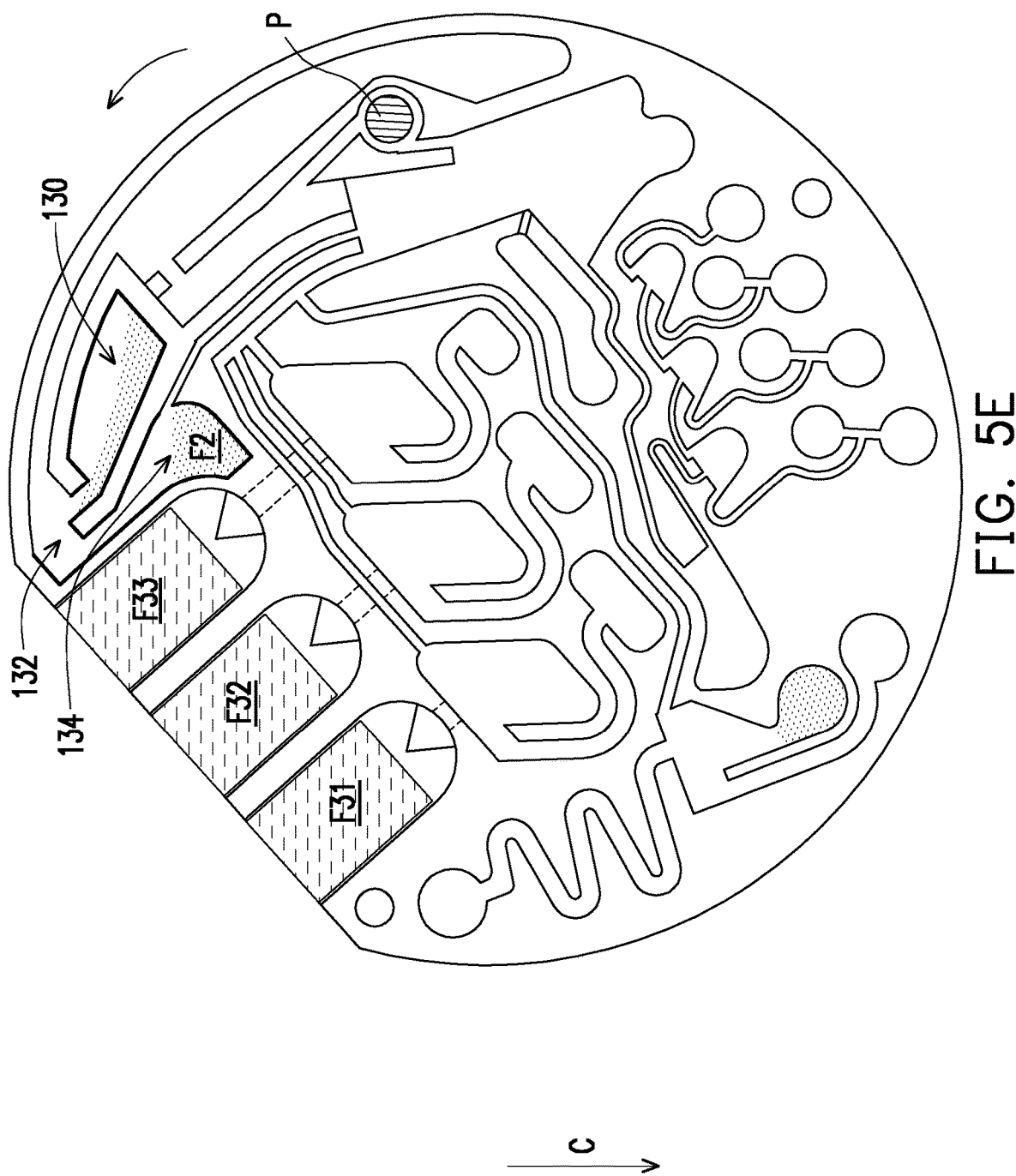

Then, the first micro-channel structure 100 is rotated relative to the direction of the centrifugal force C to the position indicated in FIG. 5E. In the embodiment, the first micro-channel structure 100 includes an injection port 132, a second quantification tank 134 connected to the injection port 132, and a tank 130 connected to the injection port 132. A second fluid F2 is injected into the injection port 132 and flows into the second quantification tank 134 and the tank 130. The second fluid F2 is a cleaning liquid, for example. However, the type of the second fluid F2 is not limited thereto.

Figure 5F:
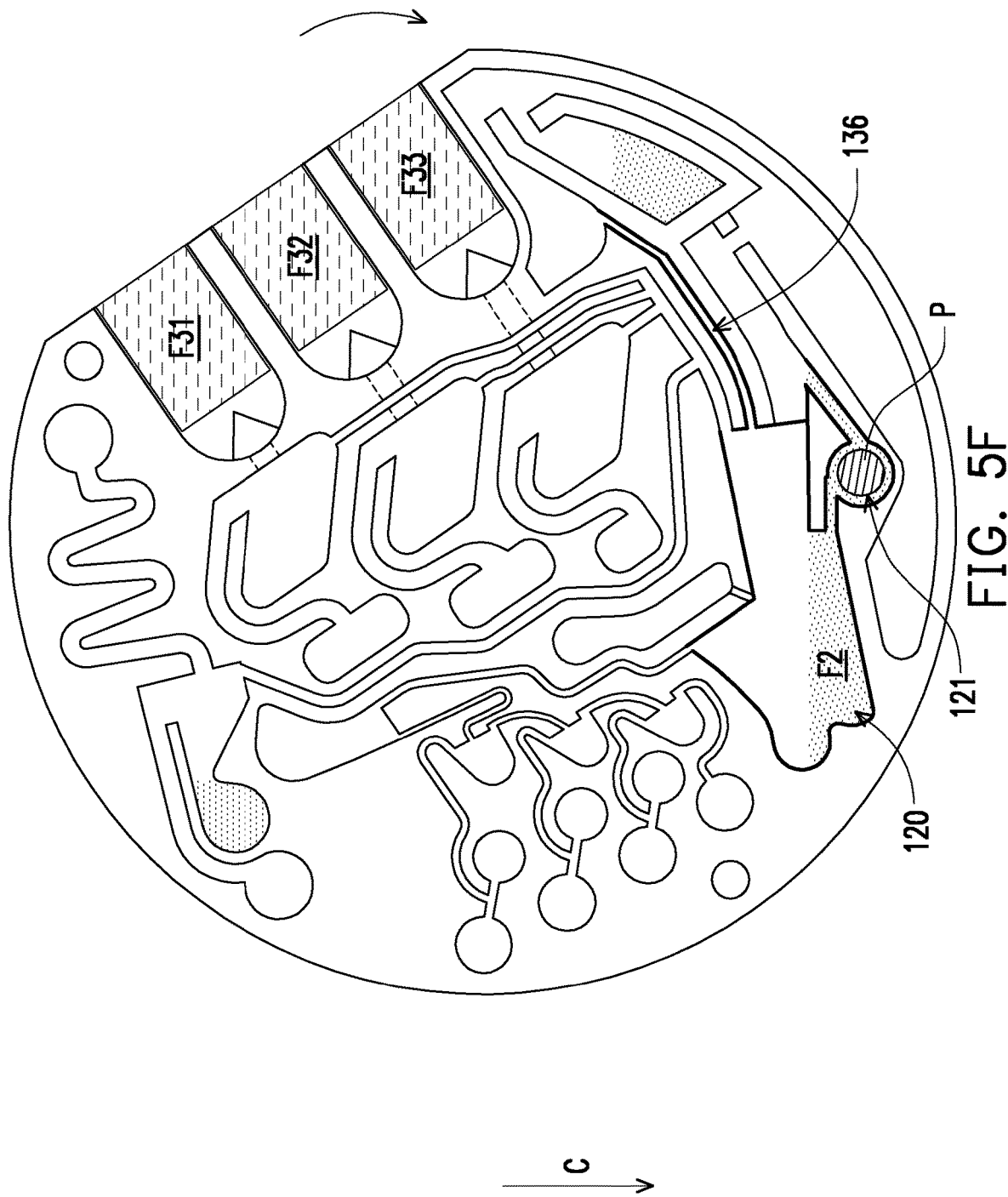

Then, the first micro-channel structure 100 is rotated relative to the direction of the centrifugal force C to the position indicated in FIG. 5F. In the embodiment, the first micro-channel structure 100 further includes a fourth bent segment 136 connected to the second quantification tank 134. The fourth bent segment 136 is connected to the first mixing tanks 120 and 121. The second driving module 22 rotates the rotatable sub-plate 20 such that the second fluid F2 located in the second quantification tank 134 is driven by the centrifugal force C to pass through the fourth bent segment 136 and enter the first mixing tanks 120 and 121.

Then, the first micro-channel structure 100 is rotated relative to the centrifugal force C to the position indicated in FIG. 5G. The second driving module 22 rotates the rotatable sub-plate 20 such that the second fluid F2 located in the first mixing tanks 120 and 121 is driven by the centrifugal force C to pass through the third bent segment 122 and enter the waste liquid tank 124.

Figure 5H:
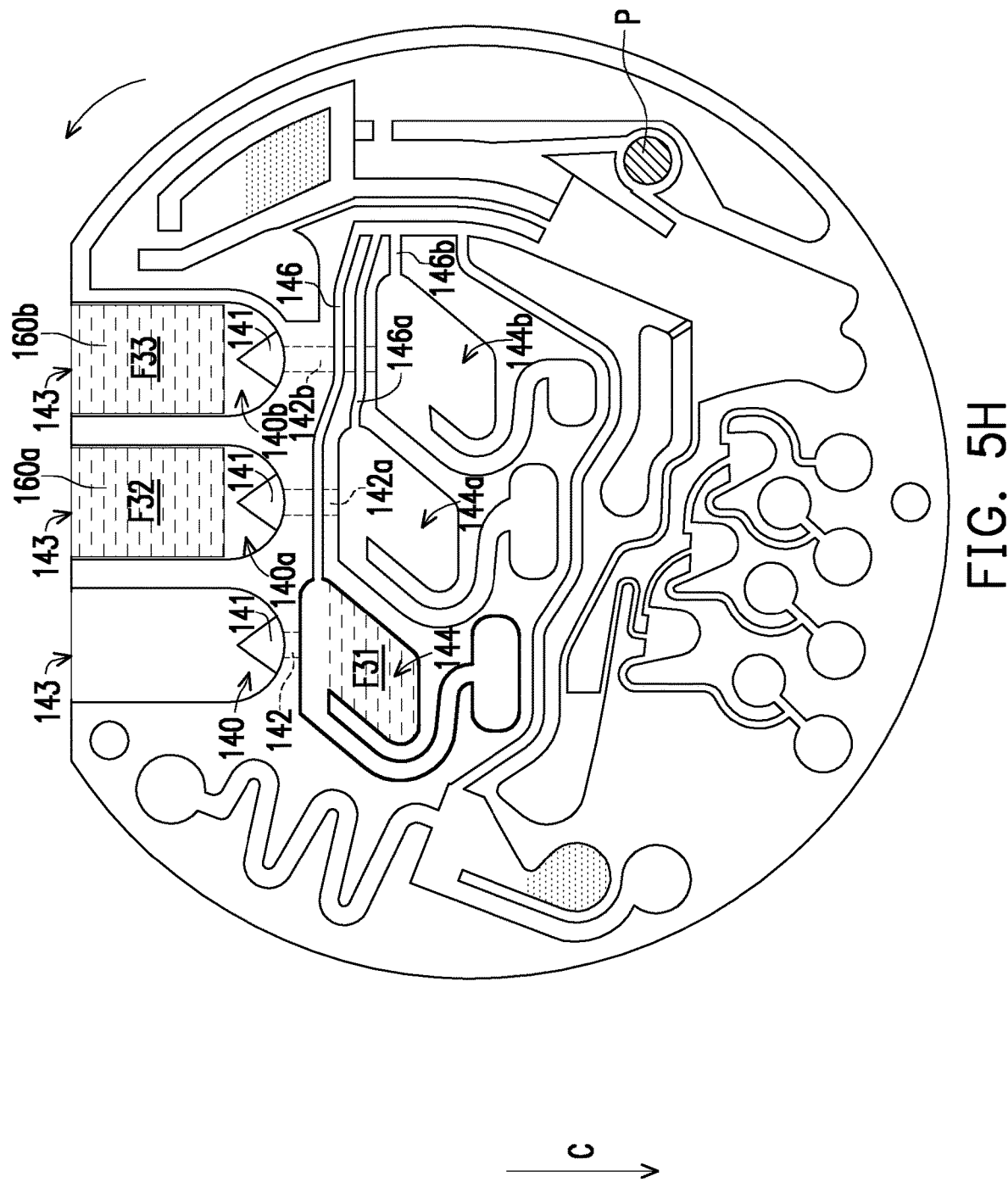

Then, the first micro-channel structure 100 is rotated relative to the direction of the centrifugal force C to the position indicated in FIG. 5H. In the embodiment, the first micro-channel structure 100 includes a storage tank 140, a fifth bent segment 142 connected to the storage tank 140, and a third quantification tank 144 connected to the fifth bent segment 142.

A third fluid F31 located in the storage tank 140 is encapsulated by the capsule 160. The storage tank 140 has an opening 143 and a needle 141 away from the opening 143. The capsule 160 is located in the storage tank 140 and beside the needle 141.

Referring to FIG. 1, the pushing rod 42 may be inserted into the opening 143 of the storage tank 140 to push the capsule 160 toward the needle 141 to break the capsule 160 and make the third fluid F31 in the capsule 160 flow out. Back to FIG. 5H, at this time, the third fluid F31 flowing out of the capsule 160 is driven by the centrifugal force C to pass through the fifth bent segment 142 and flow into the third quantification tank 144.

Then, the first micro-channel structure 100 is rotated relative to the centrifugal force C to the position indicated in FIG. 5I. In the embodiment, the first micro-channel structure 100 includes a sixth bent segment 146 connected to the third quantification tank 144. The sixth bent segment 146 is connected to the first mixing tanks 120 and 121. The third fluid F31 in the third quantification tank 144 is driven by the centrifugal force C to pass through the sixth bent segment 146 and enter the first mixing tanks 120 and 121.

Then, the first micro-channel structure 100 is rotated relative to the direction of the centrifugal force C to the position indicated in FIG. 5J. The second driving module 22 rotates the rotatable sub-plate 20 such that the third fluid F31 located in the first mixing tanks 120 and 121 is driven by the centrifugal force C to pass through the third bent segment 122 and enter the waste liquid tank 124.

Then, the processes shown in FIGS. 5E to 5G may be repeated to clean the first mixing tanks 120 and 121 by allowing the second fluid F2 (cleaning liquid) flow through the first mixing tanks 120 and 121.

Figure 5K:
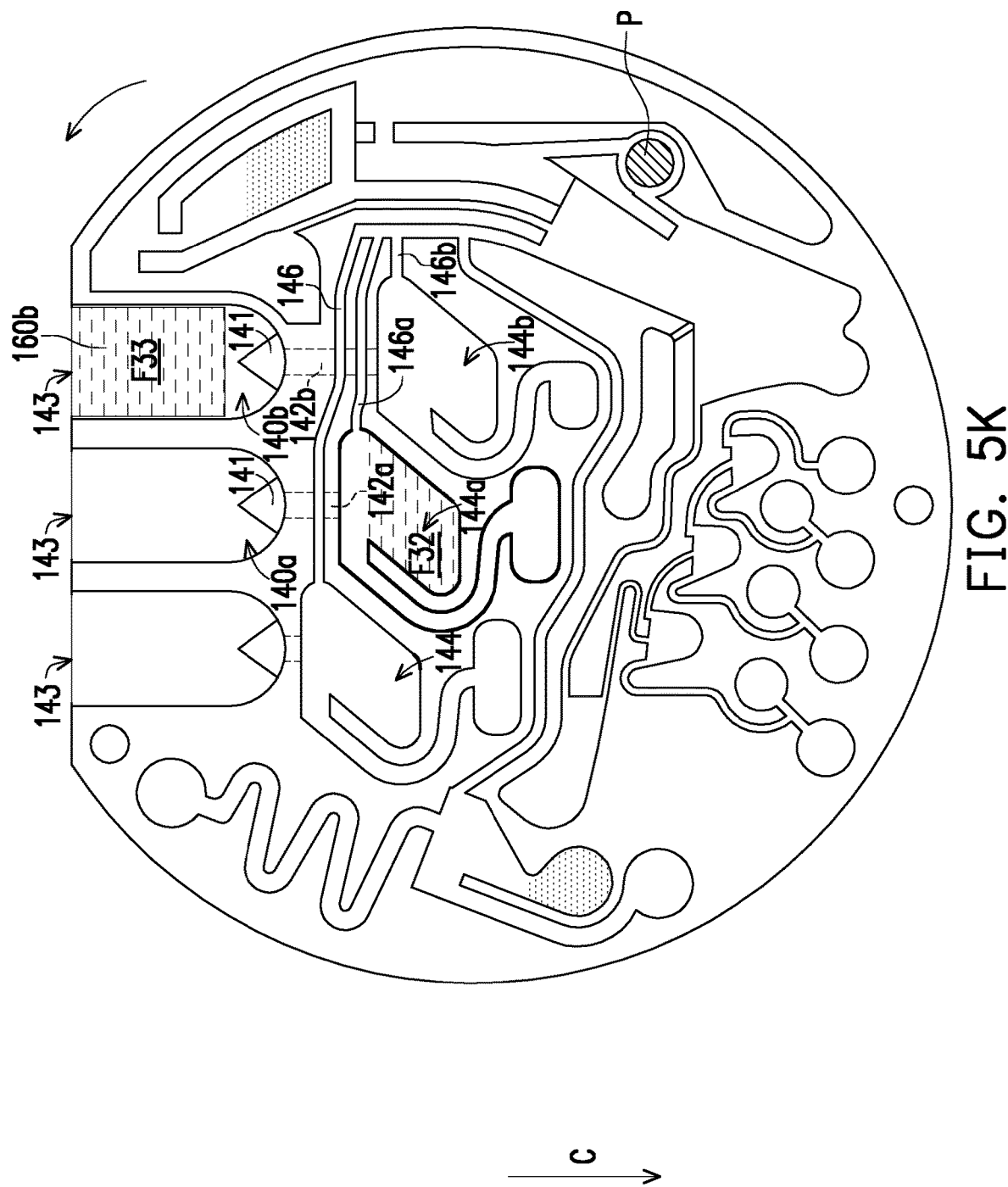

Then, the first micro-channel structure 100 is rotated relative to the direction of the centrifugal force C to the positions indicated in FIGS. 5K, 5L, and 5M sequentially. In FIG. 5K, the pushing rod 42 (as shown in FIG. 1) is operated again, so that a capsule 160a located in a storage tank 140a is broken by the needle 141, and a third fluid F32 flowing out of the capsule 160a is driven by the centrifugal force C to pass through a fifth bent segment 142a and flow into a third quantification tank 144a. Then, the third fluid F32 in the third quantification tank 144a is driven by the centrifugal force C to pass through the sixth bent segment 146a and enter the first mixing tanks 120 and 121 to be mixed with the antibody P and then pass through the third bent segment 122 and enter the waste liquid tank 124.

Then, the processes shown in FIGS. 5E to 5G may be repeated to clean the first mixing tanks 120 and 121 by allowing the second fluid F2 (cleaning liquid) flow through the first mixing tanks 120 and 121.

Figure 5N:
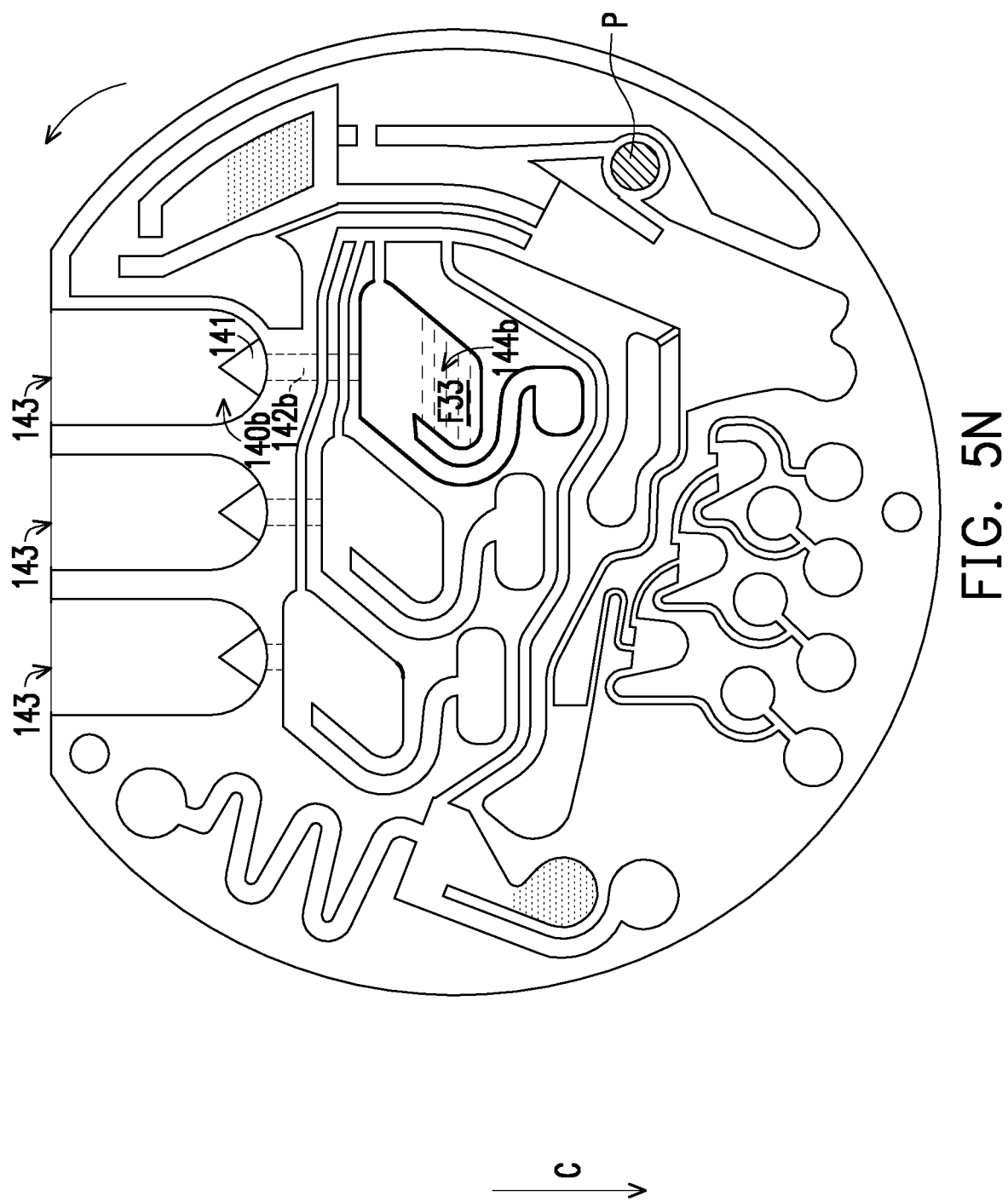

Then, the first micro-channel structure 100 is rotated relative to the direction of the centrifugal force C to the positions indicated in FIGS. 5N and 5O sequentially. In FIG. 5N, the pushing rod 42 (as shown in FIG. 1) is operated for the third time, so that a capsule 160b located in a storage tank 140b is broken by the needle 141, and a third fluid F33 in the storage tank 140b is driven by the centrifugal force C to pass through a fifth bent segment 142b and flow into a third quantification tank 144b. Then, the third fluid F33 in the third quantification tank 144b is driven by the centrifugal force C to pass through the sixth bent segment 146b and enter the first mixing tanks 120 and 121 to be mixed with the antibody P. The third fluids F31, F32, and F33 are coloring agents, for example. However, the disclosure is not limited thereto.

Figure 5P:
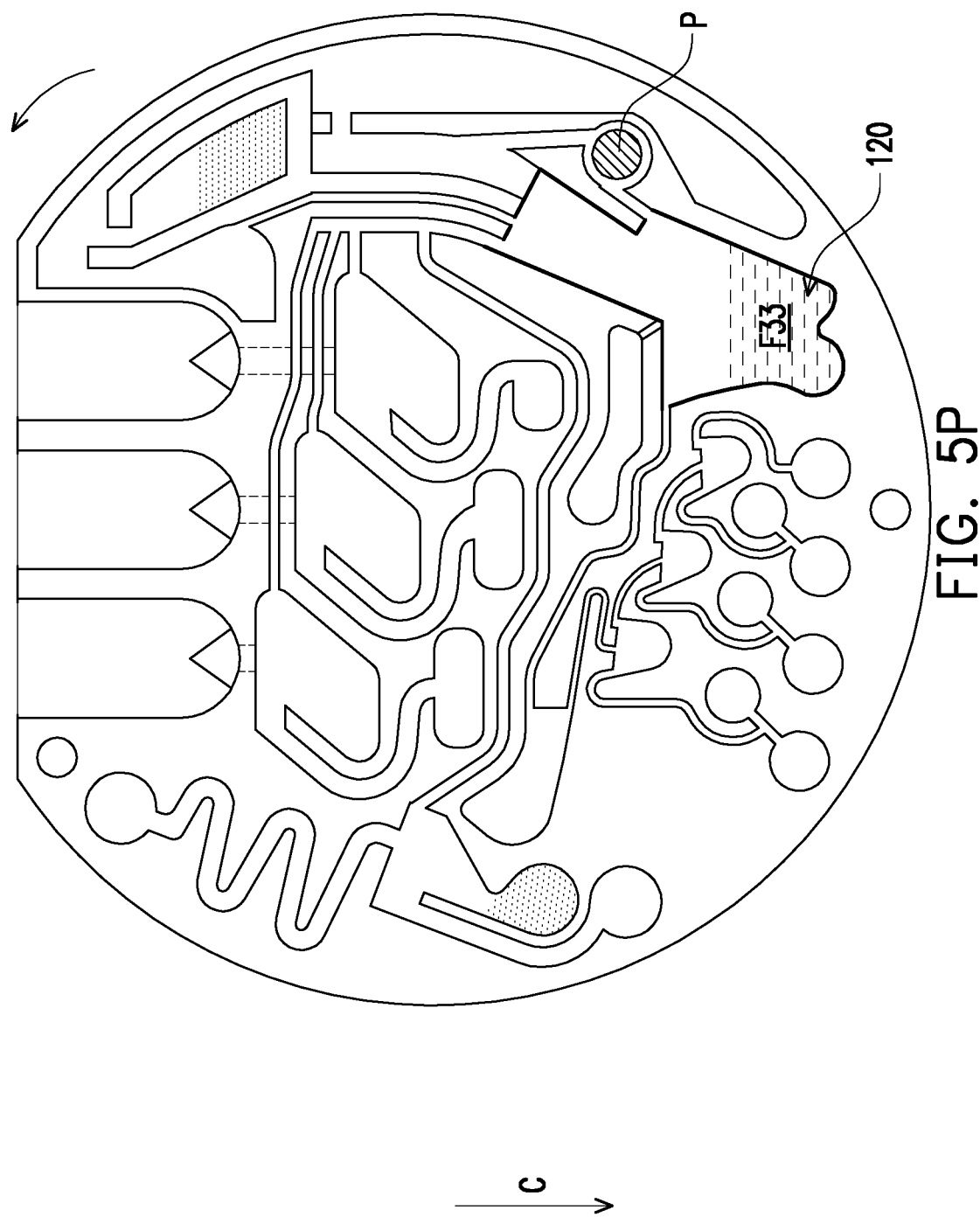

Then, the first micro-channel 100 is rotated relative to the direction of the centrifugal force C to the position indicated in FIG. 5P. At this time, a first detection may be carried out with the third fluid F33 in the first mixing tanks 120 and 121.

Figure 5Q:
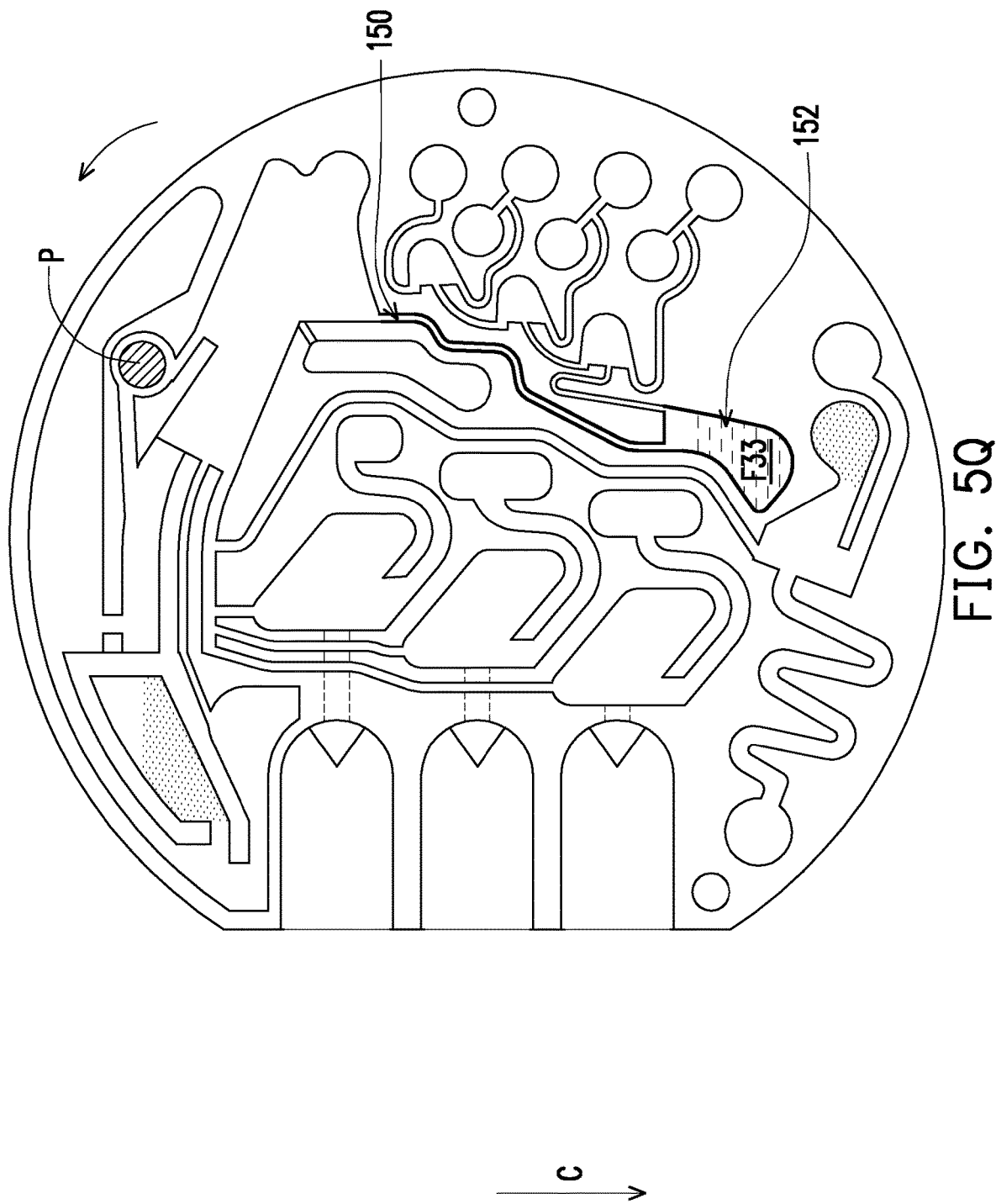
Figure 5R:
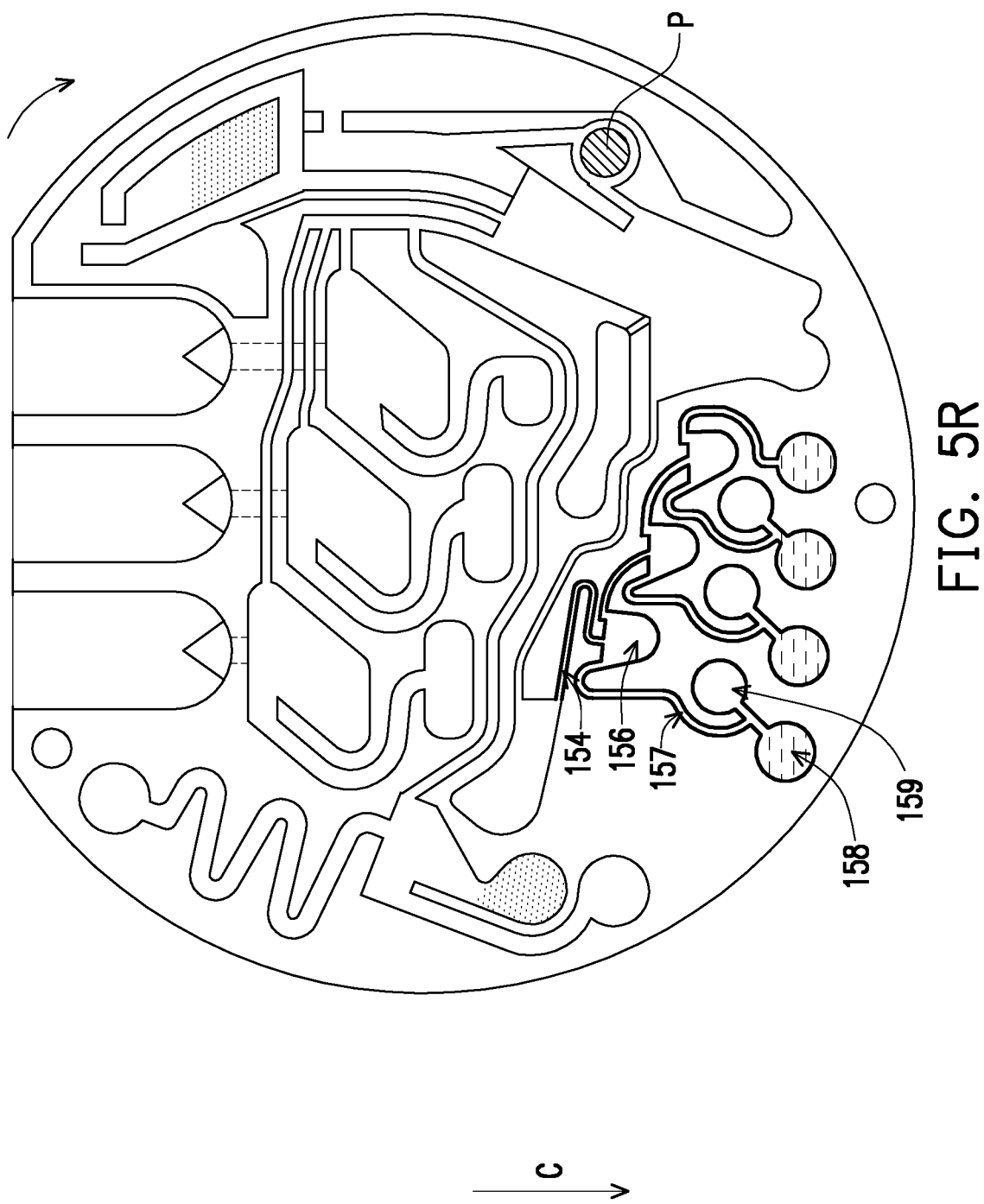

Then, the first micro-channel structure 100 is rotated relative to the direction of the centrifugal force C to the positions indicated in FIGS. 5Q and 5R sequentially. The first micro-channel structure 100 includes a seventh bent segment 150 connected to the first mixing tanks 120 and 121, a temporary storage tank 152 connected to the seventh bent segment 150, a bent segment 154 connected to the temporary storage tank 152, a fourth quantification tank 156 connected to the bent segment 154, an eighth bent segment 157 connected to the fourth quantification tank 156, and first detection tanks 158 and 159 connected to the eighth bent segment 157.

The second driving module 22 rotates the rotatable sub-plate 20 such that the fluid is driven by the centrifugal force C to sequentially pass through the seventh bent segment 150, the temporary storage tank 152, the bent segment 154, the fourth quantification tank 156, and the eighth bent segment 157 and enter the first detection tanks 158 and 159. A second detection may be carried out with the third fluid 33 in the first detection tanks 158 and 159.

Of course, the operation processes and manners of the first micro-channel fluid 100 are not limited to the above.

Figure 6A:
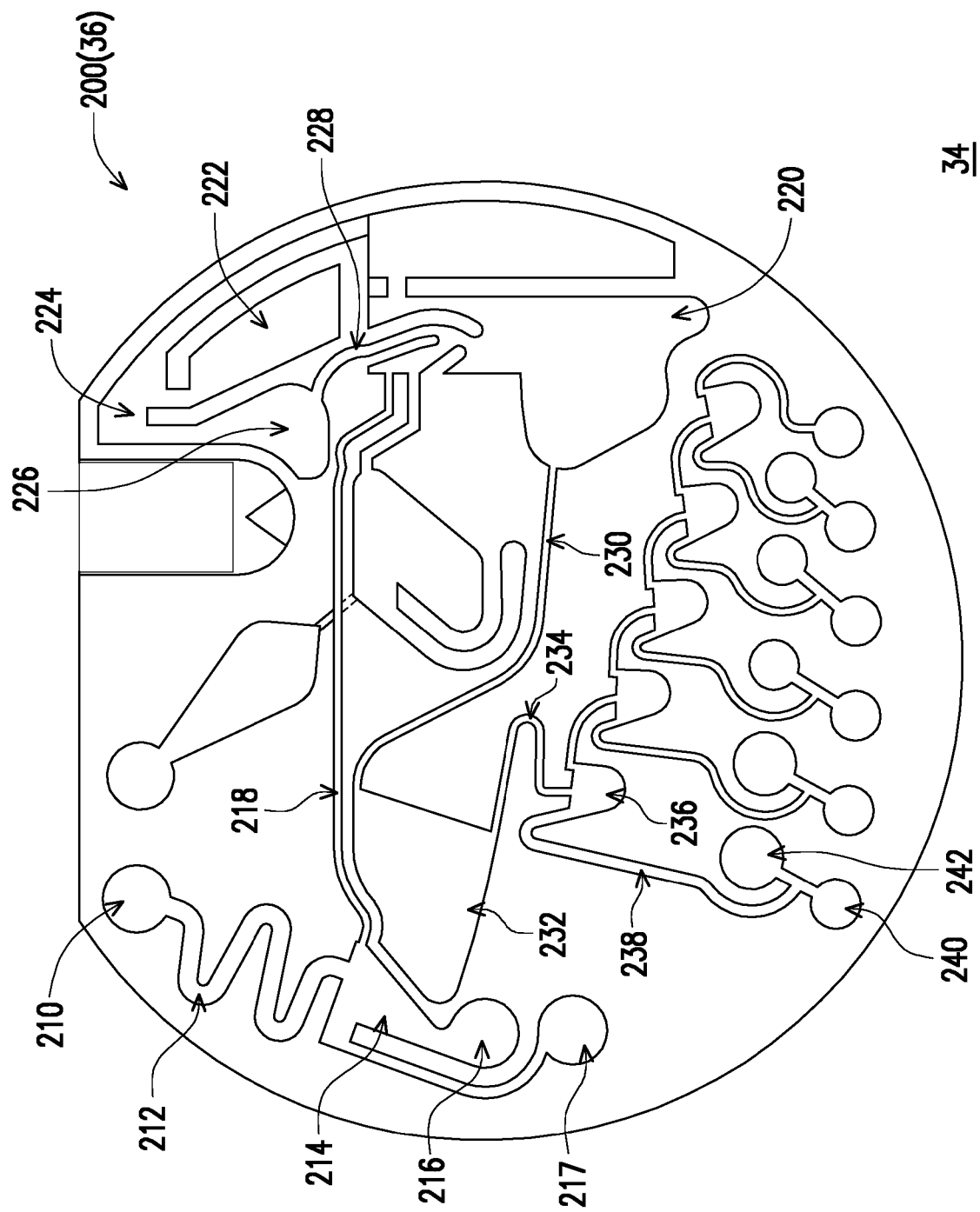
FIG. 6A is a top view of another test cassette of the biological detection system of FIG. 1.
Figure 6B:
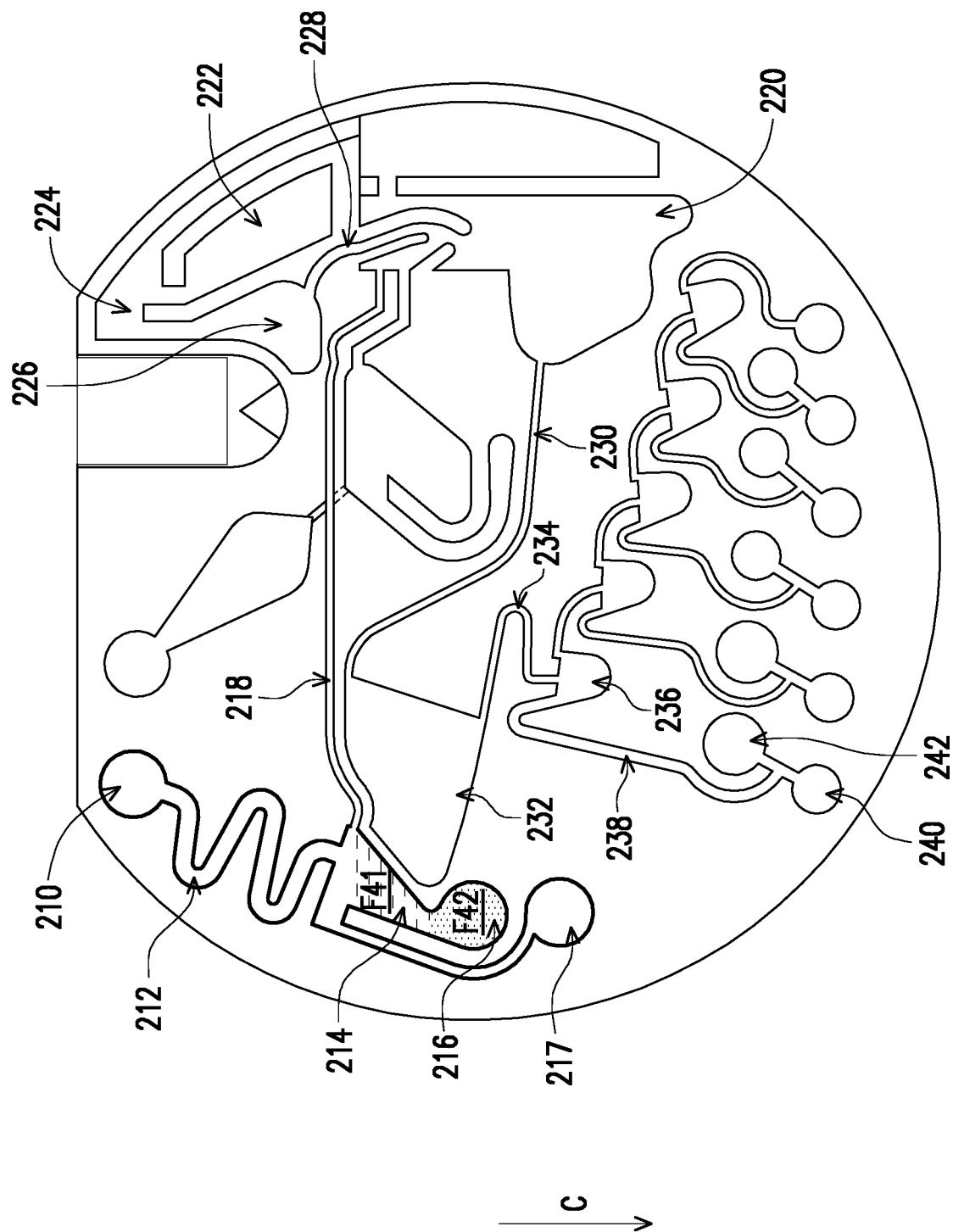

In the following, the second cassette 34 and the test process will be described. FIG. 6A is a top view of another test cassette of the biological detection system of FIG. 1. FIGS. 6B to 6H are schematic views illustrating a test process of the test cassette of FIG. 6A. Referring to FIGS. 6A and 6B, in the embodiment, the second micro-channel structure 200 includes a second sample injection port 210, a ninth bent segment 212 connected to the second sample injection port 210, a fifth quantification tank 214 connected to the ninth bent segment 212, and a separation tank 216 and an overflow tank 217 connected to the fifth quantification tank 214.

In the process from FIGS. 6A to 6B, blood (but the disclosure is not limited thereto) is injected into the second sample injection port 210. In the embodiment, the blood includes plasma (fourth fluid F41) and blood cells F42.

Under the acting of the centrifugal force C, the blood passes through the ninth bent segment 212 and is separated into plasma (the fourth fluid F41) and the blood cells F42. The blood cells F42 with a greater density may flow to the separation tank 216 at this stage, and the plasma (the fourth fluid F41) may flow to the fifth quantification tank 214 for subsequent use. In addition, in the embodiment, excessive blood may flow to the overflow tank 217.

Then, the second micro-channel structure 200 is rotated relative to the centrifugal force C to the position indicated in FIG. 6C. In the embodiment, the second micro-channel structure 200 further includes a tenth bent segment 218 connected to the fifth quantification tank 214 and a second mixing tank 220 connected to the tenth bent segment 218. The second driving module 22 corresponding to the second cassette 34 rotates the rotatable sub-plate 20 such that the fourth fluid F41 located in the fifth quantification tank 214 is driven by the centrifugal force C to pass through the tenth bent segment 218 and enter the second mixing tank 220.

Figure 6D:
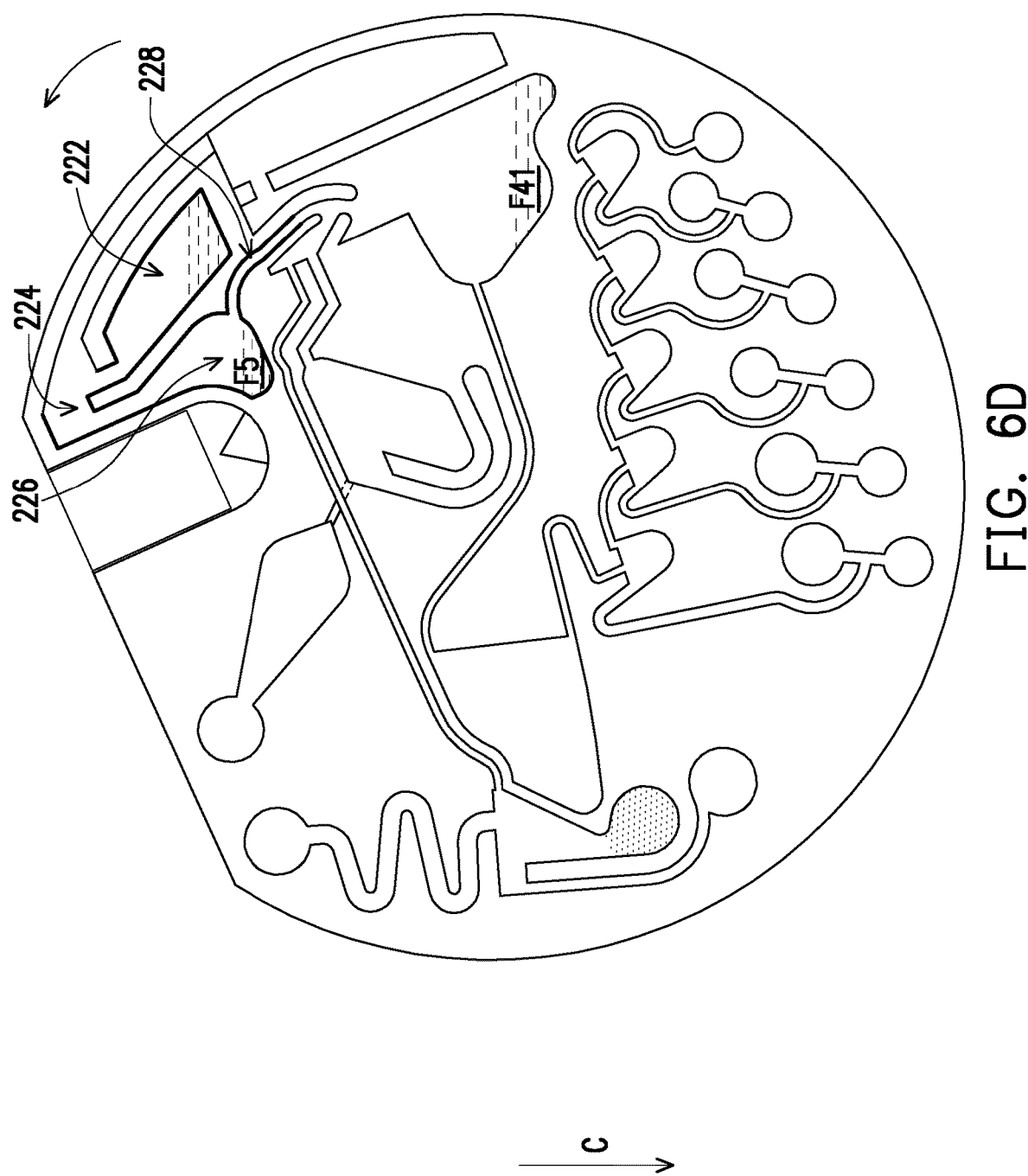

Then, the second micro-channel structure 200 is rotated relative to the direction of the centrifugal force C to the position indicated in FIG. 6D. In the embodiment, the second micro-channel structure 200 includes an injection port 224, a sixth quantification tank 226 connected to the injection port 224, and a tank 222 connected to the injection port 224. A fifth fluid F5 is injected into the injection port 224 and flows into the sixth quantification tank 226 and the tank 222. The fifth fluid F5 is a dilution liquid, for example. However, the type of the fifth fluid F5 is not limited thereto.

Figure 6E:
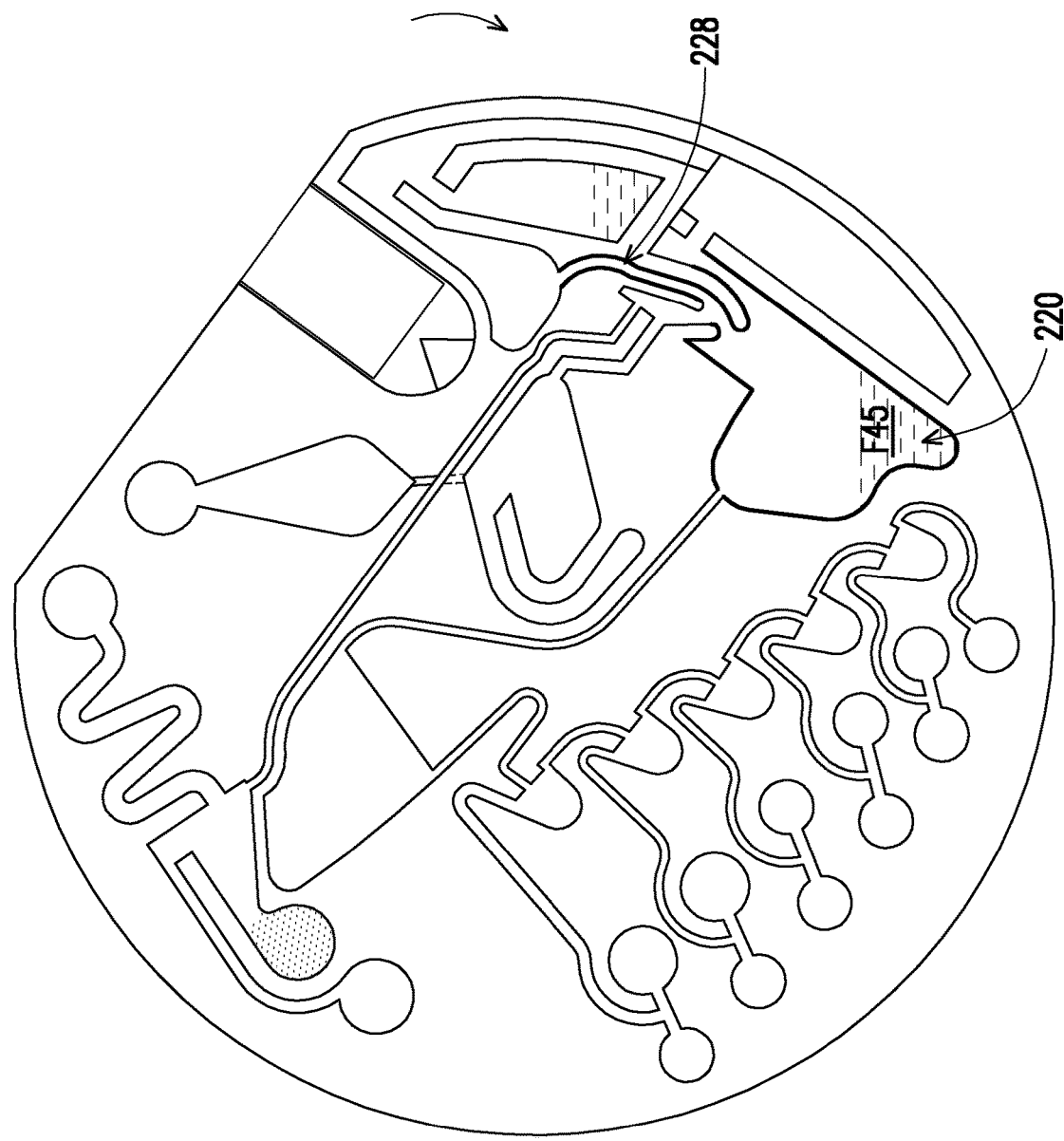

Then, the second micro-channel structure 200 is rotated relative to the direction of the centrifugal force C to the position indicated in FIG. 6E. In the embodiment, the second micro-channel structure 200 includes an eleventh bent segment 228 connected to the sixth quantification tank 226. The eleventh bent segment 228 is connected to the second mixing tank 220. The second driving module 22 rotates the rotatable sub-plate 20 such that the fifth fluid F5 located in the sixth quantification tank 226 is driven by the centrifugal force C to pass through the eleventh bent segment 228 and enter the second mixing tank 220. At this time, the fourth fluid F41 and the fifth fluid F5 are mixed and turned into a mixed fluid F45.

Figure 6F:
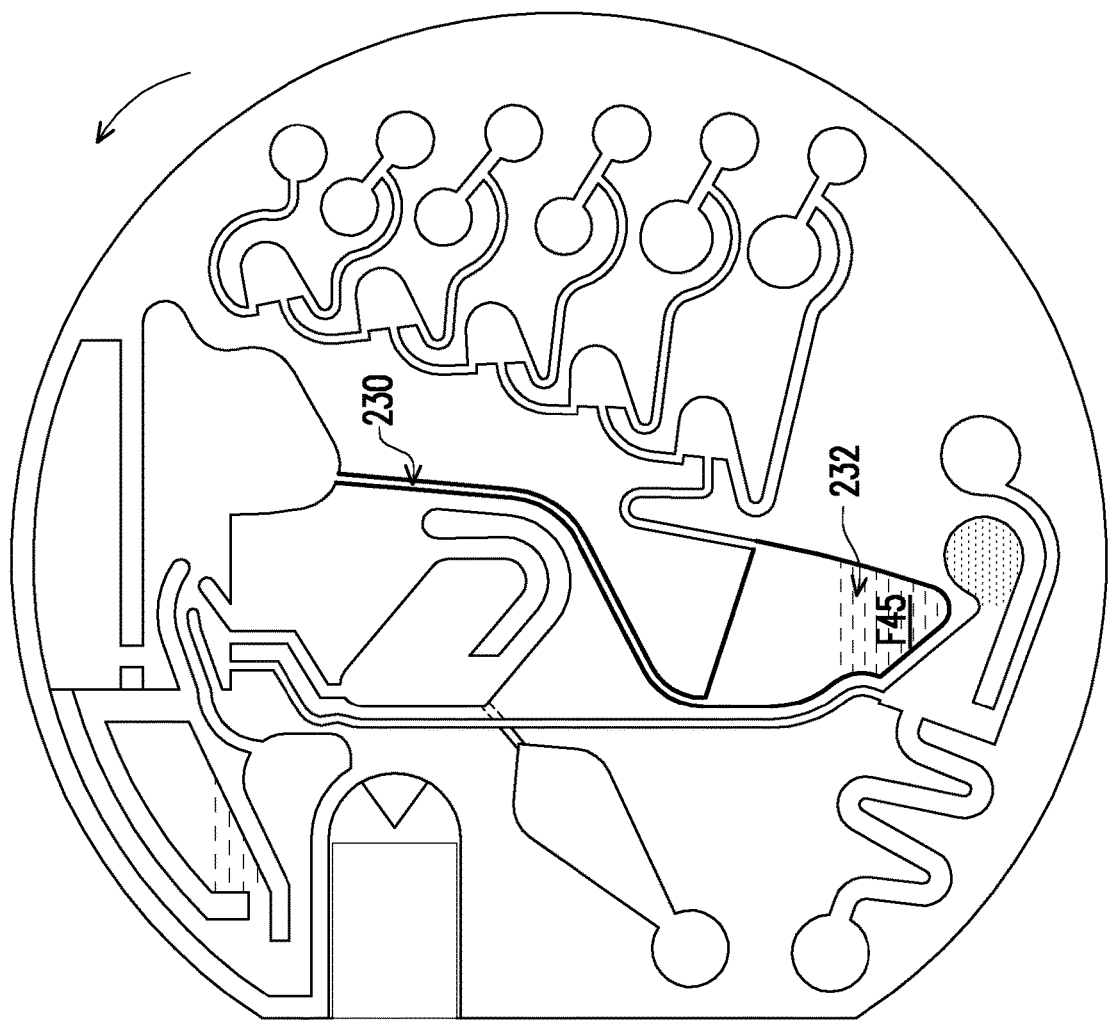
Figure 6G:
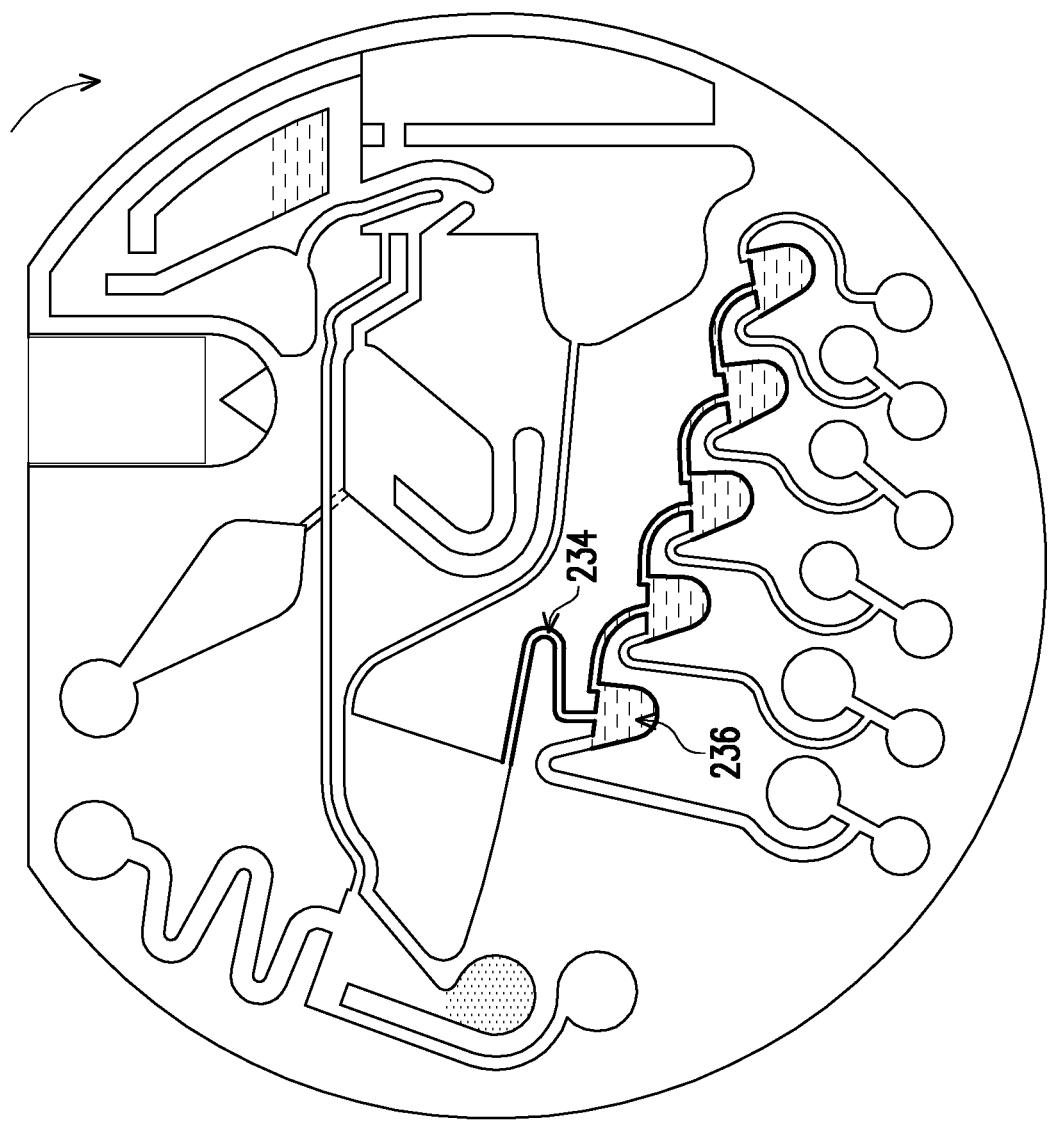
Figure 6H:
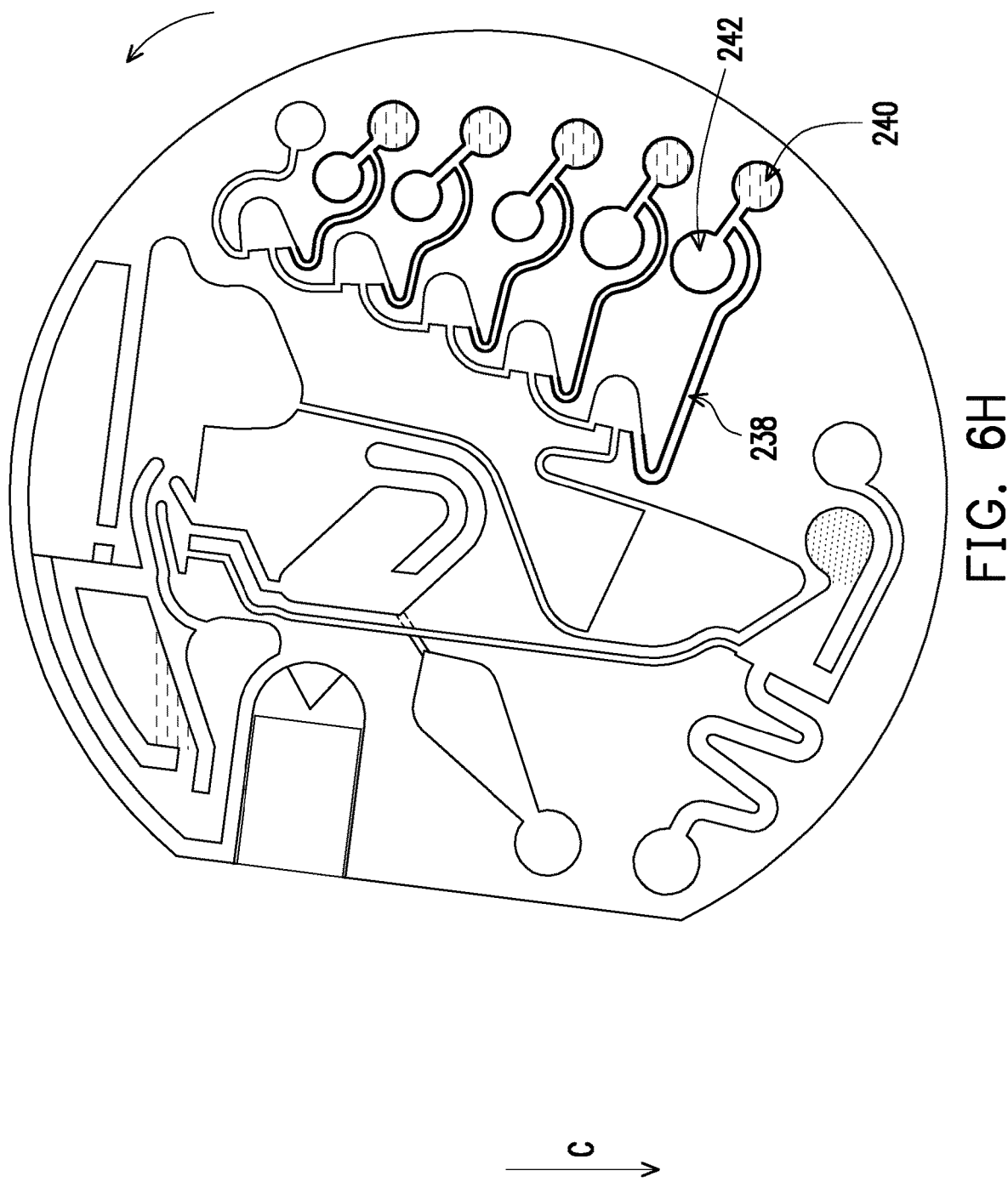

Then, the second micro-channel structure 200 is rotated relative to the direction of the centrifugal force C to the positions indicated in FIGS. 6F, 6G, and 6H sequentially. In the embodiment, the second micro-channel structure 200 includes a twelfth bent segment 230 connected to the second mixing tank 220, a temporary storage tank 232 connected to the twelfth bent segment 230, a thirteenth bent segment 234 connected to the temporary storage tank 232, a seventh quantification tank 236 connected to the thirteenth bent segment 234, a fourteenth bent segment 238 connected to the seventh quantification tank 236, and second detection tanks 240 and 242 connected to the fourteenth bent segment 238.

As shown in FIGS. 6F, 6G, and 6H, the second driving module 22 rotates the rotatable sub-plate 20 such that the mixed fluid F45 of the fourth fluid F41 and the fifth fluid F5 is driven by the centrifugal force C to sequentially pass through the twelfth bent segment 230, the temporary storage tank 232, the thirteenth bent segment 234, the seventh quantification tank 236, and the fourteenth bent segment 238 and enter the second detection tanks 240 and 242.

Of course, the operation processes and manners of the second micro-channel fluid 200 are not limited to the above.

It should be noted that the first fluid channel structure 100 of the first cassette 32 and the second fluid channel structure 200 of the second cassette 34 have different structures, and their operation processes, sequential times, rotating directions, and rotating angles are also different. Since the biological detection system 10 according to the embodiment is capable of simultaneously and independently controlling the angles of different rotatable sub-plates 20 at various time points, tests can be carried out on the first cassette 32 and the second cassette 34 at the same time, thereby reducing test operation time and providing easement to tests. In other words, as shown in FIG. 1, six different test cassettes 30 may be placed in the biological detection system 10 at the same time to provide six different micro-channel structures 36 and allow six kinds of processes, sequential times, rotating directions, and rotating angles to be conducted at the same time.

In addition, during the test processes of the test cassettes 30, the flowing directions of the fluids in the micro-channel structures 36 may be controlled to effectively carry out detection processes such as quantifying, mixing, cleaning, etc. The biological detection system 10 may continuously carry out the processes required for the test cassettes 30 without being interrupted. Each of the test cassettes 30 is not affected by the test processes of other test cassettes 30. Therefore, the biological detection system 10 may test a plurality of identical or different test cassettes 30 by using one device at the same time while satisfying the test requirements of each test cassette 30.

It should be noted that while only two forms of the test cassettes 30 are described in the embodiment, the forms described herein merely serves as examples for an illustrative purpose, and the forms and the test processes of the test cassettes 30 are not limited thereto.

Figure 7:
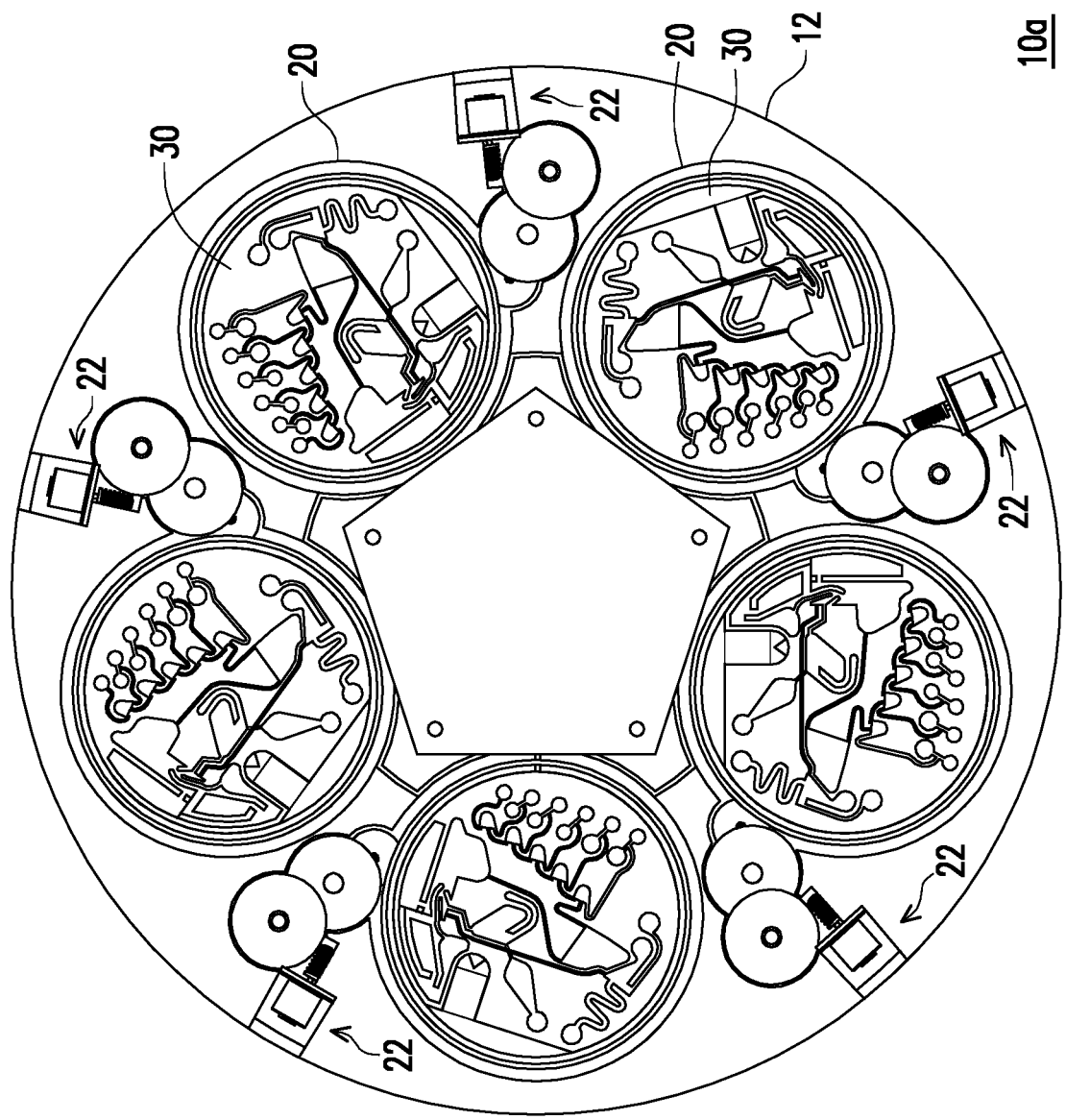
FIG. 7 is a schematic top view illustrating a biological detection system according to another embodiment of the disclosure.

FIG. 7 is a schematic top view illustrating a biological detection system according to another embodiment of the disclosure. Referring to FIG. 7, a biological detection system 10a of the embodiment is mainly different from the biological detection system 10 of FIG. 1 in that both the rotatable sub-plates 20 and the second driving modules 22 are located on the front surface of the bearing rotatable plate 12. Accordingly, the second driving modules 22 and the rotatable sub-plates 20 are located on the same side of the bearing rotatable plate 12.

Figure 8:
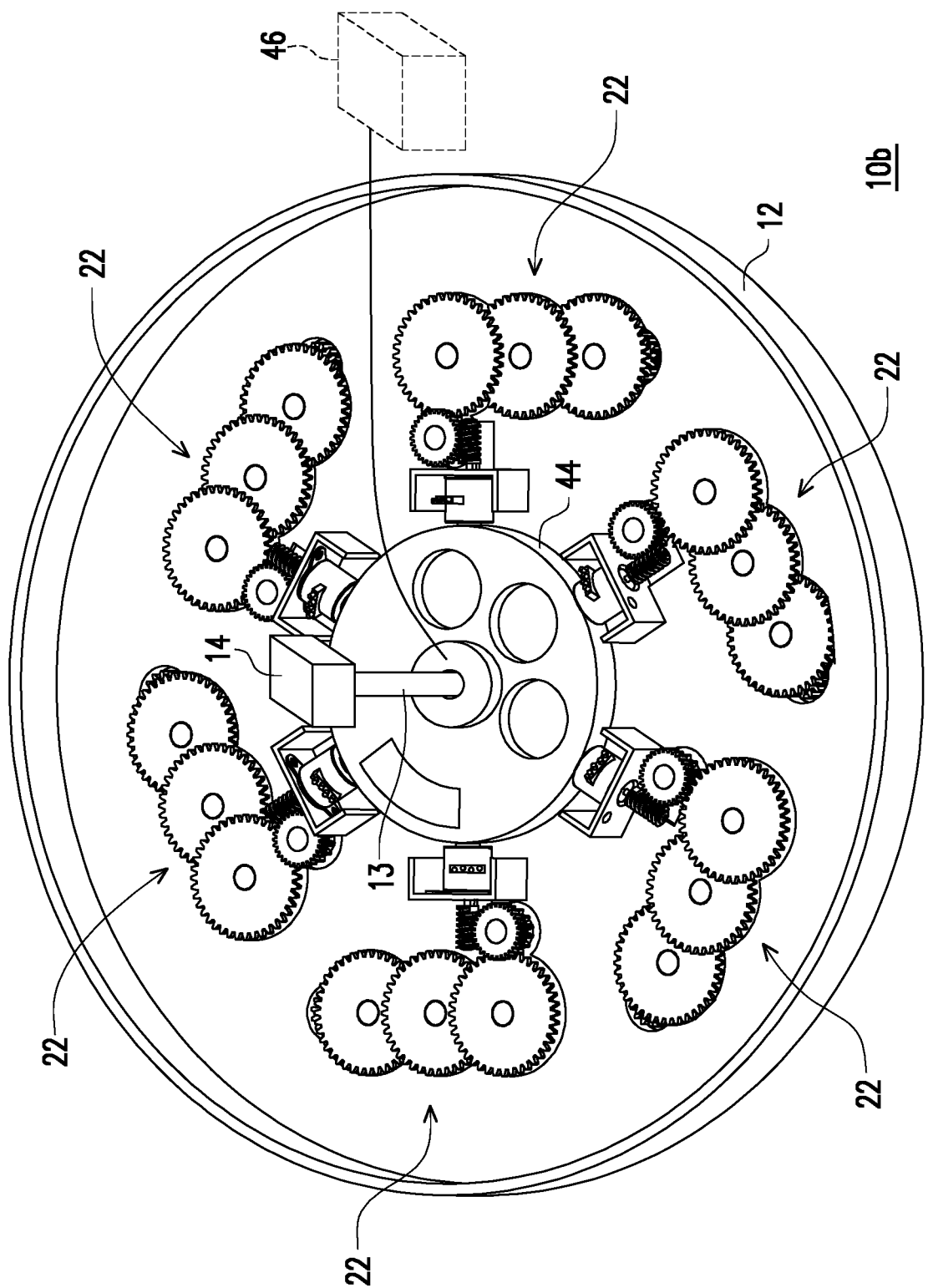
FIG. 8 is a schematic perspective view illustrating the back side of a biological detection system according to another embodiment of the disclosure.

FIG. 8 is a schematic perspective view illustrating the back side of a biological detection system according to another embodiment of the disclosure. Referring to FIG. 8, a biological detection system 10b of the embodiment mainly differs from the biological detection system 10 of FIG. 2 in that, in the embodiment, the biological detection system 10b further includes a weight member 44 and a fourth driving module 46. The weight member 44 is rotatably disposed on the bearing rotatable plate 12. The fourth driving module 46 may be a motor, a memory metal which deforms as the temperature changes, or an actuator in other forms. The fourth driving module 46 is electrically connected to the control module 11 and is connected to the weight member 44. Accordingly, the weight member 44 is rotatable relative to the bearing rotatable plate 12 to adjust the overall weight distribution. In other words, the weight member 44 and the fourth driving module 46 may automatically balance the bearing rotatable plate 12 and the rotatable sub-plates 20 such that their gravity centers are maintained near the main rotating shaft 13 during rotation, so as to reach a balance and reduce the chance of vibration. Accordingly, the rotation of the bearing rotatable plate 12 and the rotatable sub-plates 20 become more stable.

Figure 9A:
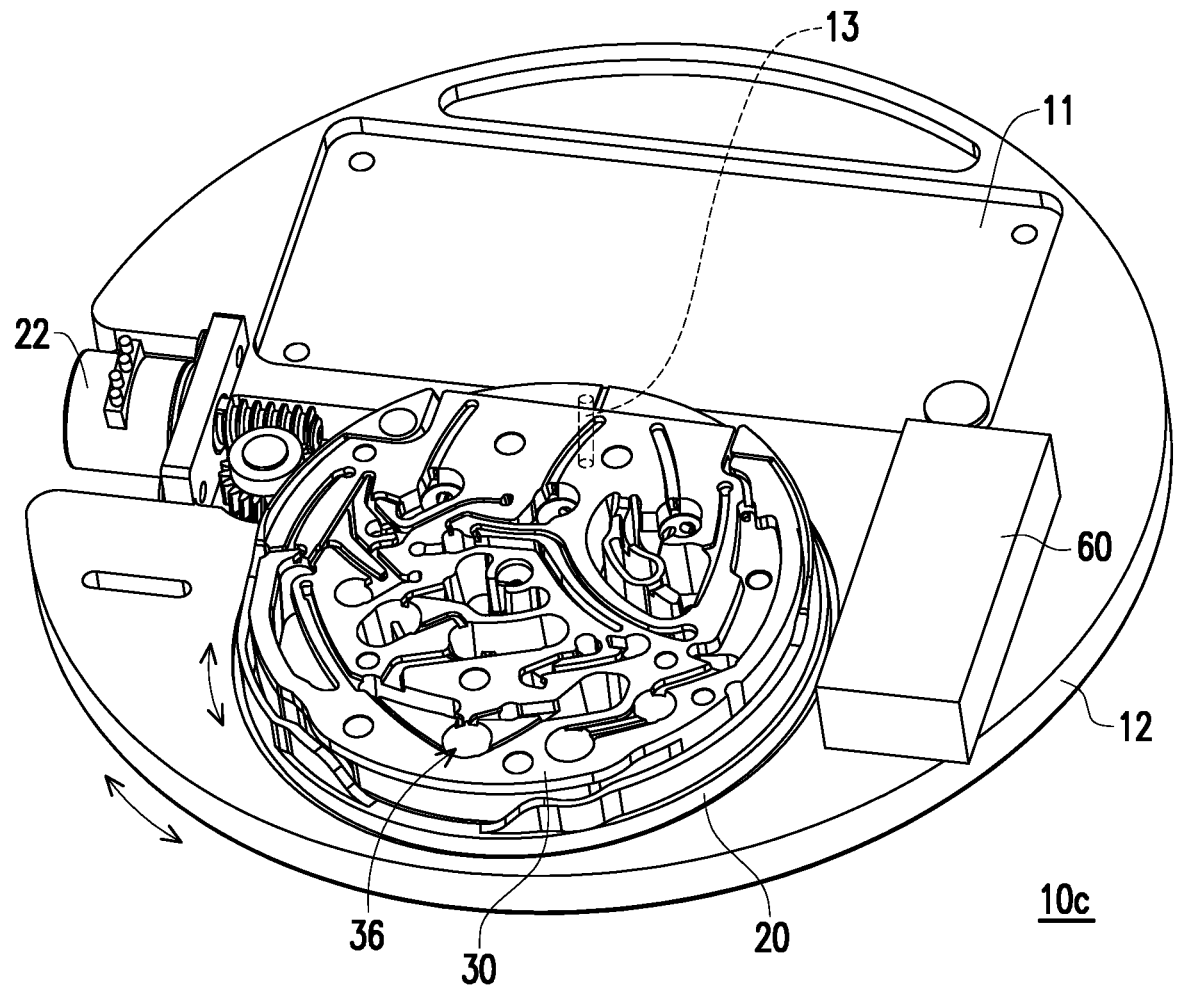
FIG. 9A is a schematic perspective view illustrating the front side of a biological detection system according to another embodiment of the disclosure.
Figure 9B:
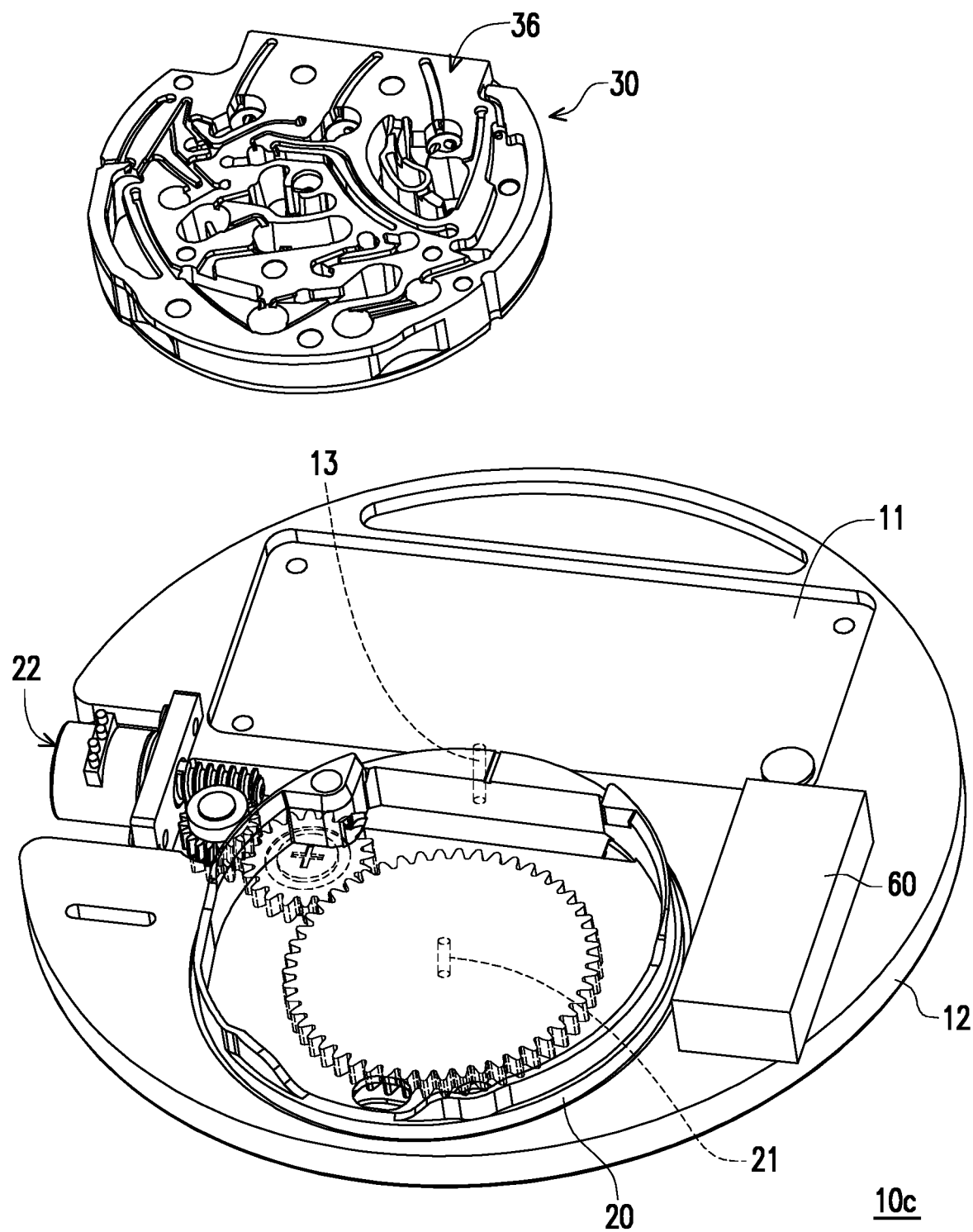
FIG. 9B is a schematic view when a test cassette is removed from the biological detection system of FIG. 9A.

FIG. 9A is a schematic perspective view illustrating the front side of a biological detection system according to another embodiment of the disclosure. FIG. 9B is a schematic view when a test cassette is removed from the biological detection system of FIG. 9A. Referring to FIGS. 9A and 9B, a biological detection system 10c of the embodiment mainly differs from the biological detection system 10 of FIG. 1 in that, in the embodiment, the number of the rotatable sub-plate 20 is one. Similarly, the bearing rotatable plate 12 may rotate about the main rotating shaft 13 to provide the centrifugal force C, and the second driving module 22 may drive the rotatable sub-plate 20 to rotate about the independent rotating shaft 21 (as shown in FIG. 9B). Accordingly, the fluid in the test cassette 30 is driven by the centrifugal force C to move in the micro-channel structure 36.

In FIGS. 9A and 9B, a rechargeable battery 60 may at least supply power to the control module 11. In an embodiment, the rechargeable battery 60 may further charge the second driving module 22. In addition, the rotatable sub-plate 20 and the control module 11 are located at opposite positions on the bearing rotatable plate 12. The test cassette 30 is disposed on the rotatable sub-plate 20 and the control module 11 is disposed opposite to the rotatable sub-plate 20. Such arrangement is advantageous for weight distribution and allows smoother rotation.

In view of the foregoing, the bearing rotatable plate of the biological detection system or the biological detection device according to the embodiments of the disclosure is driven by the first driving module to rotate about the main rotating shaft to provide a centrifugal force to the test cassettes on the bearing rotatable plate. In addition, each of the rotatable sub-plates may be independently driven by the corresponding second driving module. As a result, each of the test cassettes installed to the rotatable sub-plates may rotate independently about the independent rotating shaft, so that the fluid set in the test cassettes may receive or offset the centrifugal force provided by the bearing rotatable plate to be accelerated or decelerated in the micro-channel structures. Therefore, compared with the pipet or the capillarity phenomenon conventionally adapted to control liquid movement, the biological detection system or the biological detection device according to the embodiments of the invention rotates the bearing rotatable plate and the rotatable sub-plates via active control to quickly and efficiently drive the fluid with centrifugal force. Besides, the biological detection system according to the embodiments of the invention is capable of testing multiple test cassettes at the same time to significantly reduce test time.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A biological detection system, comprising:
   a control module;
   a bearing rotatable plate, having a main rotating shaft;
   a first driving module, electrically connected to the control module and connected to the main rotating shaft, and adapted for the bearing rotatable plate to rotate about the main rotating shaft;
   a plurality of rotatable sub-plates, each having a respective independent rotating shaft different from the main rotating shaft, wherein the rotatable sub-plates are disposed on the bearing rotatable plate and each is independently rotatable about the respective independent rotating shaft;
   a plurality of second driving modules, electrically connected to the control module, so that each of the rotatable sub-plates independently rotates about the respective independent rotating shaft; and
   a plurality of test cassettes, detachably disposed on the rotatable sub-plates, wherein the each of the test cassettes comprises a micro-channel structure adapted to be disposed with a fluid set, wherein:
   the bearing rotatable plate is driven by the first driving module to rotate about the main rotating shaft, so as to provide a centrifugal force to the test cassettes on the bearing rotatable plate, and
   each of the rotatable sub-plates is independently driven by one of the second driving modules, so that each of the test cassettes is rotated independently about the respective independent rotating shaft,
   wherein the test cassettes comprise a first cassette and a second cassette different from each other, the micro-channel structures comprise a first micro-channel structure and a second micro-channel structure different from each other, the first cassette comprises the first micro-channel structure, and the second cassette comprises the second micro-channel structure, and when the first cassette and the second cassette are respectively disposed on two of the rotatable sub-plates, the two rotatable sub-plates are driven by their corresponding second driving modules to rotate in different rotating directions, rotating speeds, or rotating angles.

2. The biological detection system as claimed in claim 1, further comprising:
   a third driving module, electrically connected to the control module and disposed on the bearing rotatable plate; and
   a pushing rod, disposed among the rotatable sub-plates and connected to the third driving module to be driven by the third driving module to approach one of the rotatable sub-plates, wherein the pushing rod is adapted to be inserted into the test cassette on the rotatable sub-plate to break a capsule in the test cassette and make a capsule fluid in the capsule flow into the micro-channel structure.

3. The biological detection system as claimed in claim 1, further comprising:
   a weight member, rotatably disposed on the bearing rotatable plate; and
   a fourth driving module, electrically connected to the control module and connected to the weight member, so that the weight member rotates relative to the bearing rotatable plate.

4. The biological detection system as claimed in claim 1, further comprising:
   a wireless or wired communication module, electrically connected to the control module to transmit an external signal to the control module to control the first driving module and at least one of the second driving modules.

5. The biological detection system as claimed in claim 1, wherein the second driving modules and the rotatable sub-plates are located on a same side or different sides of the bearing rotatable plate.

6. The biological detection system as claimed in claim 1, wherein the first micro-channel structure comprises a first sample injection port, a first bent segment connected to the first sample injection port, and a first quantification tank connected to the first bent segment, the fluid set corresponds to the first cassette and comprises a first fluid, and the first fluid is injected into the first sample injection port, wherein the second driving module corresponding to the first cassette rotates the rotatable sub-plate such that the first fluid is driven by the centrifugal force to pass through the first bent segment to flow into the first quantification tank.

7. The biological detection system as claimed in claim 6, wherein the first micro-channel structure further comprises a second bent segment connected to the first quantification tank and a first mixing tank connected to the second bent segment, the second driving module rotates the rotatable sub-plate such that the first fluid in the first quantification tank is driven by the centrifugal force to pass through the second bent segment and enter the first mixing tank.

8. The biological detection system as claimed in claim 7, wherein the first micro-channel structure further comprises a third bent segment connected to the first mixing tank and a waste liquid tank connected to the third bent segment, the second driving module rotates the rotatable sub-plate such that the first fluid in the first mixing tank is driven by the centrifugal force to pass through the third bent segment and enter the waste liquid tank.

9. The biological detection system as claimed in claim 1, wherein the first micro-channel structure comprises a second quantification tank, a fourth bent segment connected to the second quantification tank, and a first mixing tank connected to the fourth bent segment, the fluid set corresponds to the first cassette and comprises a second fluid, the second driving module rotates the rotatable sub-plate such that the second fluid is driven by the centrifugal force to sequentially pass through the second quantification tank and the fourth bent segment and enter the first mixing tank.

10. The biological detection system as claimed in claim 1, wherein the first micro-channel structure comprises a storage tank, a fifth bent segment connected to the storage tank, a third quantification tank connected to the fifth bent segment, a sixth bent segment connected to the third quantification tank, and a first mixing tank connected to the sixth bent segment, the fluid set corresponds to the first cassette and comprises a third fluid located in the storage tank, the second driving module rotates the rotatable sub-plate such that the third fluid located in the storage tank is driven by the centrifugal force to sequentially pass through the fifth bent segment, the third quantification tank, and the sixth bent segment and enter the first mixing tank.

11. The biological detection system as claimed in claim 10, wherein the third fluid is encapsulated by a capsule, the storage tank comprises an opening and a needle away from the opening, the capsule is located in the storage tank and beside the needle.

12. The biological detection system as claimed in claim 1, wherein the first micro-channel structure comprises a first mixing tank, a seventh bent segment connected to the first mixing tank, a fourth quantification tank connected to the seventh bent segment, an eighth bent segment connected to the fourth quantification tank, and a first detection tank connected to the eighth bent segment, the second driving module rotates the rotatable sub-plate such that the fluid is driven by the centrifugal force to sequentially pass through the seventh bent segment, the fourth quantification tank, and the eighth bent segment and enter the first detection tank.

13. The biological detection system as claimed in claim 1, wherein the second micro-channel structure comprises a second sample injection port, a ninth bent segment connected to the second sample injection port, a fifth quantification tank connected to the ninth bent segment, a tenth bent segment connected to the fifth quantification tank, and a second mixing tank connected to the tenth bent segment, the fluid set corresponds to the second cassette and comprises a fourth fluid, the second driving module corresponding to the second cassette rotates the rotatable sub-plate such that the fourth fluid is driven by the centrifugal force to sequentially pass through the ninth bent segment, the fifth quantification tank, and the tenth bent segment and enter the second mixing tank.

14. The biological detection system as claimed in claim 1, wherein the second micro-channel structure comprises a sixth quantification tank, an eleventh bent segment connected to the sixth quantification tank, and a second mixing tank connected to the eleventh bent segment, the fluid set corresponds to the second cassette and comprises a fifth fluid, the second driving module rotates the rotatable sub-plate such that the fifth fluid is driven by the centrifugal force to sequentially pass through the sixth quantification tank and the eleventh bent segment and enter the second mixing tank.

15. The biological detection system as claimed in claim 1, wherein the second micro-channel structure comprises a second mixing tank, a twelfth bent segment connected to the second mixing tank, a temporary storage tank connected to the twelfth bent segment, a thirteenth bent segment connected to the temporary storage tank, a seventh quantification tank connected to the thirteenth bent segment, a fourteenth bent segment connected to the seventh quantification tank, and a second detection tank connected to the fourteenth bent segment, the second driving module rotates the rotatable sub-plate such that a fluid is driven by the centrifugal force to sequentially pass through the twelfth bent segment, the temporary storage tank, the thirteenth bent segment, the seventh quantification tank, and the fourteenth bent segment and enter the second detection tank.

16. The biological detection system as claimed in claim 1, wherein when the bearing rotatable plate rotates about the main rotating shaft, a rotating direction or a rotating speed of at least one of the rotatable sub-plates is different from a rotating direction or a rotating speed of the bearing rotatable plate.

17. A biological detection device, adapted to detect at least one test cassette, wherein each of the test cassette comprises a micro-channel structure and a fluid located in the micro-channel structure, and the biological detection device comprises:
    a control module;
    a bearing rotatable plate, having a main rotating shaft;
    a first driving module, electrically connected to the control module and connected to the main rotating shaft, and adapted for the bearing rotatable plate to rotate about the main rotating shaft;
    at least one rotatable sub-plate, having at least one independent rotating shaft different from the main rotating shaft, wherein each of the rotatable sub-plate is disposed on the bearing rotatable plate and independently rotatable about the respective independent rotating shaft; and
    at least one second driving module, electrically connected to the control module, so that the at least one rotatable sub-plate rotates about the at least one independent rotating shaft,
    wherein the test cassettes comprise a first cassette and a second cassette different from each other, the micro-channel structures comprise a first micro-channel structure and a second micro-channel structure different from each other, the first cassette comprises the first micro-channel structure, and the second cassette comprises the second micro-channel structure, and when the first cassette and the second cassette are respectively disposed on two of the rotatable sub-plates, the two rotatable sub-plates are driven by their corresponding second driving modules to rotate in different rotating directions, rotating speeds, or rotating angles.

18. The biological detection device as claimed in claim 17, further comprising:
a third driving module, electrically connected to the control module and disposed on the bearing rotatable plate; and
a pushing rod, disposed beside the at least one rotatable sub-plate and connected to the third driving module to be driven by the third driving module to approach one of the at least one rotatable sub-plate, wherein the pushing rod is adapted to be inserted into the test cassette on the rotatable sub-plate to break a capsule in the test cassette and make a capsule fluid in the capsule flow into the micro-channel structure.

19. The biological detection device as claimed in claim 17, further comprising:
a weight member, rotatably disposed on the bearing rotatable plate; and
a fourth driving module, electrically connected to the control module and connected to the weight member, so that the weight member rotates relative to the bearing rotatable plate.

20. The biological detection device as claimed in claim 17, further comprising:
a wireless or wired communication module, electrically connected to the control module to transmit an external signal to the control module to control the first driving module and at least one of the second driving modules.

21. The biological detection device as claimed in claim 17, wherein the at least one second driving module and the at least one rotatable sub-plate are located on a same side or different sides of the bearing rotatable plate.

22. The biological detection device as claimed in claim 17, wherein the at least one rotatable sub-plate comprises a plurality of rotatable sub-plates disposed on the bearing rotatable plate to surround the main rotating shaft.

23. The biological detection device as claimed in claim 17, wherein the at least one rotatable sub-plate comprises one rotatable sub-plate, and the rotatable sub-plate and the control module are located at opposite positions on the bearing rotatable plate.

24. The biological detection device as claimed in claim 17, wherein when the bearing rotatable plate is driven by the first driving module to rotate about the main rotating shaft, the at least one rotatable sub-plate is independently driven by the corresponding at least one second driving module, so that a rotating direction or a rotating speed of the at least one rotatable sub-plate is different from a rotating direction or a rotating speed of the bearing rotatable plate.

* * * * *